(12) United States Patent
Miura et al.

(10) Patent No.: US 12,017,728 B2
(45) Date of Patent: Jun. 25, 2024

(54) HUMAN-POWERED VEHICLE

(71) Applicant: Shimano Inc., Osaka (JP)

(72) Inventors: Keisuke Miura, Osaka (JP); Atsushi Komatsu, Osaka (JP); Tadaharu Kurotobi, Osaka (JP); Shingo Sakurai, Osaka (JP); Satoshi Idogaki, Osaka (JP)

(73) Assignee: Shimano Inc., Osaka (JP)

( * ) Notice: Subject to any disclaimer, the term of this patent is extended or adjusted under 35 U.S.C. 154(b) by 667 days.

(21) Appl. No.: 17/192,225

(22) Filed: Mar. 4, 2021

(65) Prior Publication Data

US 2021/0284277 A1    Sep. 16, 2021

(30) Foreign Application Priority Data

Mar. 13, 2020    (JP) .................... 2020-044193

(51) Int. Cl.
| | | |
|---|---|---|
| *B62M 6/40* | (2010.01) | |
| *B25J 9/16* | (2006.01) | |
| *B62M 6/45* | (2010.01) | |
| *B62M 6/90* | (2010.01) | |
| *H04B 1/06* | (2006.01) | |

(52) U.S. Cl.
CPC .............. *B62M 6/45* (2013.01); *B25J 9/1694* (2013.01); *B62M 6/40* (2013.01); *B62M 6/90* (2013.01); *H04B 1/06* (2013.01)

(58) Field of Classification Search
CPC .......... B62M 6/45; B62M 25/08; B62M 6/55; B62M 6/80; B60L 2200/12; B60L 15/20; B60L 2240/70; B60L 50/20
See application file for complete search history.

(56) References Cited

U.S. PATENT DOCUMENTS

| | | | | |
|---|---|---|---|---|
| 2014/0163797 A1* | 6/2014 | Schieffelin | ............... | B62M 6/90 701/22 |
| 2016/0014252 A1* | 1/2016 | Biderman | ................ | A61G 5/04 701/29.2 |
| 2016/0318575 A1* | 11/2016 | Shimoda | ............... | B60T 8/3225 |
| 2017/0225742 A1* | 8/2017 | Hancock | ................ | G01S 19/19 |

(Continued)

FOREIGN PATENT DOCUMENTS

| | | |
|---|---|---|
| JP | 9-95287 A | 4/1997 |
| JP | 9-193877 A | 7/1997 |

(Continued)

*Primary Examiner* — Abby Y Lin
*Assistant Examiner* — Dylan M Katz
(74) *Attorney, Agent, or Firm* — Global IP Counselors, LLP

(57) ABSTRACT

A human-powered vehicle control device for a human-powered vehicle includes an electronic controller that controls a motor assisting in propulsion of the human-powered vehicle. The electronic controller is configured to control the motor in a first control state that limits at least one of a first driving time of the motor assisting in propulsion of the human-powered vehicle, a first driving number of times of the motor, a driving timing of the motor, a second driving time for driving the motor so that an output of the motor becomes greater than or equal to a predetermined output value, and a second driving number of times for driving the motor so that the output of the motor becomes greater than or equal to the predetermined output value.

34 Claims, 9 Drawing Sheets

(56) References Cited

U.S. PATENT DOCUMENTS

| | | |
|---|---|---|
| 2019/0144070 A1 | 5/2019 | Shahana et al. |
| 2019/0156590 A1* | 5/2019 | Ramey .................. G07C 1/24 |
| 2019/0217699 A1* | 7/2019 | Choi ................ B60L 15/2045 |
| 2019/0225298 A1 | 7/2019 | Takahashi et al. |
| 2019/0300105 A1* | 10/2019 | Marshall ............... B62J 45/412 |
| 2019/0311626 A1* | 10/2019 | Clyne .................... B62J 45/41 |

FOREIGN PATENT DOCUMENTS

| | | |
|---|---|---|
| JP | 2001-199378 A | 7/2001 |
| JP | 2014-193081 A | 10/2014 |
| JP | 2018-30543 A | 3/2018 |
| JP | 6391846 B2 | 8/2018 |
| JP | 2019-89481 A | 6/2019 |
| JP | 2019-127141 A | 8/2019 |
| JP | 2019-189137 A | 10/2019 |

\* cited by examiner

HUMAN-POWERED VEHICLE

CROSS-REFERENCE TO RELATED APPLICATIONS

This application claims priority to Japanese Patent Application No. 2020-044193, filed on Mar. 13, 2020. The entire disclosure of Japanese Patent Application No. 2020-044193 is hereby incorporated herein by reference.

BACKGROUND

Technical Field

The present disclosure generally relates to a human-powered vehicle control device for a human-powered vehicle, a server that transmits information to a human-powered vehicle component, a communication system related to a human-powered vehicle, and a method for controlling a human-powered vehicle component.

Background Information

Japanese Laid-Open Patent Publication No. 2016-7905 (Patent Document 1) discloses an example of a human-powered vehicle that includes a control device controlling a human-powered vehicle component.

SUMMARY

One object of the present disclosure is to provide a human-powered vehicle control device for a human-powered vehicle, a server that transmits information to a human-powered vehicle component, a communication system related to a human-powered vehicle, and a method for controlling a human-powered vehicle component that improve usability.

A human-powered vehicle control device in accordance with a first aspect of the present disclosure is for a human-powered vehicle. The human-powered vehicle control device comprises an electronic controller configured to control controls a motor assisting in propulsion of the human-powered vehicle. The electronic controller is configured to control the motor in a first control state that limits at least one of a first driving time of the motor assisting in propulsion of the human-powered vehicle, a first driving number of times of the motor, a driving timing of the motor, a second driving time for driving the motor so that an output of the motor becomes greater than or equal to a predetermined output value, and a second driving number of times for driving the motor so that the output of the motor becomes greater than or equal to the predetermined output value. The human-powered vehicle control device according to the first aspect controls the motor in the first control state to limit at least one of the first driving time, the first driving number of times, the driving timing, the second driving time, and the second driving number of times. This improves the usability.

In accordance with a second aspect of the present disclosure, the human-powered vehicle control device according to the first aspect is configured so that the electronic controller is configured to limit at least one of the first driving time, the first driving number of times, the driving timing, the second driving time, and the second driving number of times regardless of at least one of a travel state of the human-powered vehicle and a battery level of a battery in the first control state. The human-powered vehicle control device according to the second aspect limits at least one of the first driving time, the first driving number of times, the driving timing, the second driving time, and the second driving number of times regardless of at least one of the travel state of the human-powered vehicle and the battery level in the first control state.

In accordance with a third aspect of the present disclosure, the human-powered vehicle control device according to the first or second aspect is configured so that the electronic controller is configured to switch between the first control state and a second control state that controls the motor differently from the first control state, and the electronic controller is configured to control the motor in accordance with at least one of a travel state of the human-powered vehicle and a battery level of a battery in the second control state. The human-powered vehicle control device according to the third aspect is switchable between the first control state and the second control state configured to control the motor in accordance with at least one of the travel state of the human-powered vehicle and the battery level.

In accordance with a fourth aspect of the present disclosure, the human-powered vehicle control device according to the third aspect is configured so that the electronic controller is configured not to control the motor in accordance with the travel state of the human-powered vehicle and the battery level in the first control state. In a case of controlling the motor in the first control state, the human-powered vehicle control device according to the fourth aspect limits the first driving time, the first driving number of times, the driving timing, the second driving time, and the second driving number of times regardless of the travel state of the human-powered vehicle and the battery level.

In accordance with a fifth aspect of the present disclosure, the human-powered vehicle control device according to the third or fourth aspect is configured so that the electronic controller is configured to control the motor so that the output of the motor becomes less than or equal to the predetermined output value in the second control state. The human-powered vehicle control device according to the fifth aspect controls the motor in the second control state so that the output of the motor becomes less than or equal to the predetermined output value.

In accordance with a sixth aspect of the present disclosure, the human-powered vehicle control device according to the third or fourth aspect is configured so that the electronic controller is configured to be switchable from the first control state to the second control state where a predetermined condition is satisfied in the first control state. In a case where the predetermined condition is satisfied in the first control state, the human-powered vehicle control device according to the sixth aspect is switchable from the first control state to the second control state.

In accordance with a seventh aspect of the present disclosure, the human-powered vehicle control device according to the sixth aspect is configured so that the electronic controller is configured to switch from the first control state to the second control state in a case where the predetermined condition is satisfied and predetermined information for switching from the first control state to the second control state is input in the first control state. In a case where the predetermined condition is satisfied and the predetermined information is input in the first control state, the human-powered vehicle control device according to the seventh aspect switches from the first control state to the second control state In accordance with an eighth aspect of the present disclosure, the human-powered vehicle control device according to the sixth or seventh aspect is configured so that the electronic controller is configured to maintain the first control state in a case where the predetermined condition is not satisfied and the predetermined information is input in the first control state. In a case where the predetermined condition is not satisfied and the predetermined information is input in the first control state, the human-powered vehicle control device according to the eighth aspect maintains the first control state.

In accordance with a ninth aspect of the present disclosure, the human-powered vehicle control device according to any one of the sixth to eighth aspects is configured so that the electronic controller is configured to maintain the first control state in a case where the predetermined condition is satisfied and the predetermined information has not been input in the first control state. In a case where the predetermined condition is satisfied and the predetermined information is not input in the first control state, the human-powered vehicle control device according to the ninth aspect maintains the first control state.

A human-powered vehicle control device in accordance with a tenth aspect of the present disclosure is for a human-powered vehicle. The human-powered vehicle control device comprises an electronic controller configured to switch between a first control state that restricts usage of a motor assisting in propulsion of the human-powered vehicle and a second control state that controls the motor differently from the first control state. The electronic controller is configured to switch from the first control state to the second control state in a case where a predetermined condition is satisfied and predetermined information for switching from the first control state to the second control state is input in the first control state. In a case where the predetermined condition is satisfied and the predetermined information is input in the first control state, the human-powered vehicle control device according to the tenth aspect switches from the first control state to the second control state. Thus, the usability is improved.

In accordance with an eleventh aspect of the present disclosure, the human-powered vehicle control device according to the tenth aspect is configured so that the electronic controller is configured to maintain the first control state in a case where the predetermined condition is not satisfied and the predetermined information is input in the first control state. In a case where the predetermined condition is not satisfied and the predetermined information is input in the first control state, the human-powered vehicle control device according to the eleventh aspect maintains the first control state.

In accordance with a twelfth aspect of the present disclosure, the human-powered vehicle control device according to the tenth or eleventh aspect is configured so that the electronic controller is configured to maintain the first control state in a case where the predetermined condition is satisfied and the predetermined information has not been input in the first control state. In a case where the predetermined condition is satisfied and the predetermined information is not input in the first control state, the human-powered vehicle control device according to the twelfth aspect maintains the first control state.

In accordance with a thirteenth aspect of the present disclosure, the human-powered vehicle control device according to any one of the ninth to twelfth aspects is configured so that the electronic controller is configured to switch from the first control state to the second control state in a case where the predetermined condition is satisfied and the predetermined information is input in the first control state. In a case where the predetermined condition is satisfied and the predetermined information is input, the human-powered vehicle control device according to the thirteenth aspect switches from the first control state to the second control state.

In accordance with a fourteenth aspect of the present disclosure, the human-powered vehicle control device according to any one of the ninth to thirteenth aspects is configured so that the predetermined information includes at least one of a password and software for switching from the first control state to the second control state. The human-powered vehicle control device according to the fourteenth aspect switches from the first control state to the second control state in a case where the predetermined condition is satisfied and at least one of the password and the software for switching from the first control state to the second control state is input.

In accordance with a fifteenth aspect of the present disclosure, the human-powered vehicle control device according to any one of the sixth to fourteenth aspects is configured so that the predetermined condition is satisfied in at least one of a case where an elapsed period from switching of the second control state to the first control state becomes longer than or equal to a predetermined elapsed period, a case where a predetermined time is reached, a case where traveling on a predetermined traveling route is completed, and a case where a predetermined spot is reached. The human-powered vehicle control device according to the fifteenth aspect switches from the first control state to the second control state in at least one of a case where the elapsed period from switching of the second control state to the first control state becomes longer than or equal to the predetermined elapsed period, a case where the predetermined time is reached, a case where traveling on the predetermined traveling route is completed, and a case where the predetermined spot is reached.

In accordance with a sixteenth aspect of the present disclosure, the human-powered vehicle control device according to any one of the third to fifteenth aspects further comprises storage. The electronic controller is configured to store in the storage information related to which one of the first control state and the second control state is selected. The human-powered vehicle control device according to the sixteenth aspect stores information related to which one of the first control state and the second control state is selected in the storage.

In accordance with a seventeenth aspect of the present disclosure, the human-powered vehicle control device according to any one of the third to sixteenth aspects further comprises a storage. The electronic controller is configured to output to an external device information related to which one of the first control state and the second control state is selected. The human-powered vehicle control device according to the seventeenth aspect outputs information related to which one of the first control state and the second control state is selected to the external device.

In accordance with an eighteenth aspect of the present disclosure, the human-powered vehicle control device according to any one of the first to sixteenth aspects further comprises a storage configured to store limit information related to driving limitation of the motor and a receiver that receives the limit information. The electronic controller is configured to store the limit information received by the receiver in the storage. The electronic controller is configured to control the motor in accordance with the limit information in the first control state. The human-powered vehicle control device according to the eighteenth aspect controls the motor in accordance with the limit information received by the receiver.

A human-powered vehicle control device in accordance with a nineteenth aspect of the present disclosure is for a human-powered vehicle. The human-powered vehicle control device comprises a storage configured to store limit information related to driving limitation of a motor assisting in propulsion of the human-powered vehicle, a receiver configured to receive the limit information, and an electronic controller configured to store the limit information received by the receiver in the storage and controls the motor in accordance with the limit information. The human-powered vehicle control device according to the nineteenth aspect controls the motor in accordance with the limit information received by the receiver.

In accordance with a twentieth aspect of the present disclosure, the human-powered vehicle control device according to the eighteenth or nineteenth aspect is configured so that the receiver includes a wireless receiver. The human-powered vehicle control device according to the twentieth aspect receives the limit information with the wireless receiver.

In accordance with a twenty-first aspect of the present disclosure, the human-powered vehicle control device according to any one of the eighteenth to twentieth aspects is configured so that the receiver includes a wired receiver. The human-powered vehicle control device according to the twenty-first aspect receives the limit information with the wired receiver.

A human-powered vehicle control device in accordance with a twenty-second aspect of the present disclosure is for a human-powered vehicle. The human-powered vehicle control device comprises a receiver configured to receive control information for controlling a human-powered vehicle component, storage configured to store the control information, and an electronic controller configured to store the control information received by the receiver in the storage. The electronic controller is configured to store the control information received by the receiver in the storage in a case where a condition for participating in a predetermined race is satisfied. The human-powered vehicle control device according to the twenty-second aspect stores the control information received by the receiver in the storage in a case where the condition for participating in the predetermined race is satisfied.

In accordance with a twenty-third aspect of the present disclosure, the human-powered vehicle control device according to the twenty-second aspect is configured so that the condition for participating in the predetermined race is satisfied in a case where information related to entry of the predetermined race is stored in the storage. In a case where the information related to entry of the predetermined race is stored in the storage, the human-powered vehicle control device according to the twenty-third aspect stores the control information received by the receiver in the storage.

In accordance with a twenty-fourth aspect of the present disclosure, the human-powered vehicle control device according to the twenty-second or twenty-third aspect is configured so that the human-powered vehicle component includes a motor assisting in propulsion of the human-powered vehicle, and the control information includes limit information related to driving limitation of the motor. The human-powered vehicle control device according to the twenty-fourth aspect stores the control information including the limit information related to usage limitation of the motor in the storage.

A human-powered vehicle control device in accordance with a twenty-fifth aspect of the present disclosure is for a human-powered vehicle. The human-powered vehicle control device comprises an electronic controller configured to control an antilock brake system of the human-powered vehicle in a third control state that limits at least one of an operation time of the antilock brake system, an operation number of times of the antilock brake system, and an operation timing of the antilock brake system. The human-powered vehicle control device according to the twenty-fifth aspect controls the antilock brake system in the third control state to limit at least one of the operation time of the antilock brake system, the operation number of times of the antilock brake system, and the operation timing of the antilock brake system. This improves the usability.

A human-powered vehicle control device in accordance with a twenty-sixth aspect of the present disclosure is for a human-powered vehicle. The human-powered vehicle control device comprises an electronic controller configured to control a battery of the human-powered vehicle in a fourth control state that limits at least one of a usage time of the battery, a usage number of times of the battery, and a usage timing of the battery. The human-powered vehicle control device according to the twenty-sixth aspect controls the battery in the fourth control state to limit at least one of the usage time of the battery, the usage number of times of the battery, and the usage timing of the battery. This improves the usability.

A server in accordance with a twenty-seventh aspect of the present disclosure transmits information to a human-powered vehicle component. The server comprises a storage configured to store control information for controlling the human-powered vehicle component, a transmitter configured to transmit the control information stored in the storage, and an electronic controller configured to control the transmitter. The electronic controller is configured to control the transmitter to transmit the control information to the human-powered vehicle component that satisfies a condition for participating in a predetermined race. The server according to the twenty-seventh aspect transmits control information to the component that satisfies the condition for participating in the predetermined race. This improves the usability.

In accordance with a twenty-eighth aspect of the present disclosure, the server according to the twenty-seventh aspect is configured so that the condition for participating in the predetermined race is satisfied in a case where information related to entry of the predetermined race is stored in storage of the human-powered vehicle component. The server according to the twenty-eighth aspect transmits control information to the component associated with the component in which the information related to entry of the predetermined race is stored. This improves the usability.

In accordance with a twenty-ninth aspect of the present disclosure, the server according to the twenty-seventh or twenty-eighth aspect is configured so that the condition for participating in the predetermined race includes at least one of a case where the human-powered vehicle component can receive information transmitted from the transmitter in a predetermined time slot and a case where the human-powered vehicle component is located in a predetermined area. The server according to the twenty-ninth aspect transmits the control information in at least one of a case where the component can receive information transmitted from the transmitter in the predetermined time slot and a case where the human-powered vehicle component is located in the predetermined area. This improves the usability.

In accordance with a thirtieth aspect of the present disclosure, the server according to any one of the twenty-seventh to twenty-ninth aspects is configured so that the control information includes information corresponding to model numbers of the human-powered vehicle component. The server according to the thirtieth aspect transmits the control information including information corresponding to the model numbers of the component.

In accordance with a thirty-first aspect of the present disclosure, the server according to any one of the twenty-seventh to thirtieth aspects is configured so that the human-powered vehicle component includes a motor assisting in propulsion of the human-powered vehicle, and the control information includes limit information related to driving limitation of the motor. The server according to the thirty-first aspect transmits control information including the limit information related to usage limitation of the motor to the component.

A communication system in accordance with a thirty-second aspect of the present disclosure is related to a human-powered vehicle. The communication system comprises the human-powered vehicle control device according to any one of the first to twenty-sixth aspects and the server according to any one of the twenty-seventh to thirty-first aspects. The communication system according to the thirty-second aspect improves the usability.

A method in accordance with a thirty-third aspect of the present disclosure is for controlling a human-powered vehicle component. The method comprises receiving limit information that limits usage of the human-powered vehicle component from an external device storing the limit information, and controlling the human-powered vehicle component in accordance with the limit information stored in the storage. The control method according to the thirty-third aspect improves the usability.

According to the present disclosure, the human-powered vehicle control device for a human-powered vehicle, the server that transmits information to a human-powered vehicle component, the communication system related to a human-powered vehicle, and the method for controlling a human-powered vehicle component improve usability.

BRIEF DESCRIPTION OF THE DRAWINGS

Referring now to the attached drawings which form a part of this original disclosure.

DETAILED DESCRIPTION OF EMBODIMENTS

Figure 1:
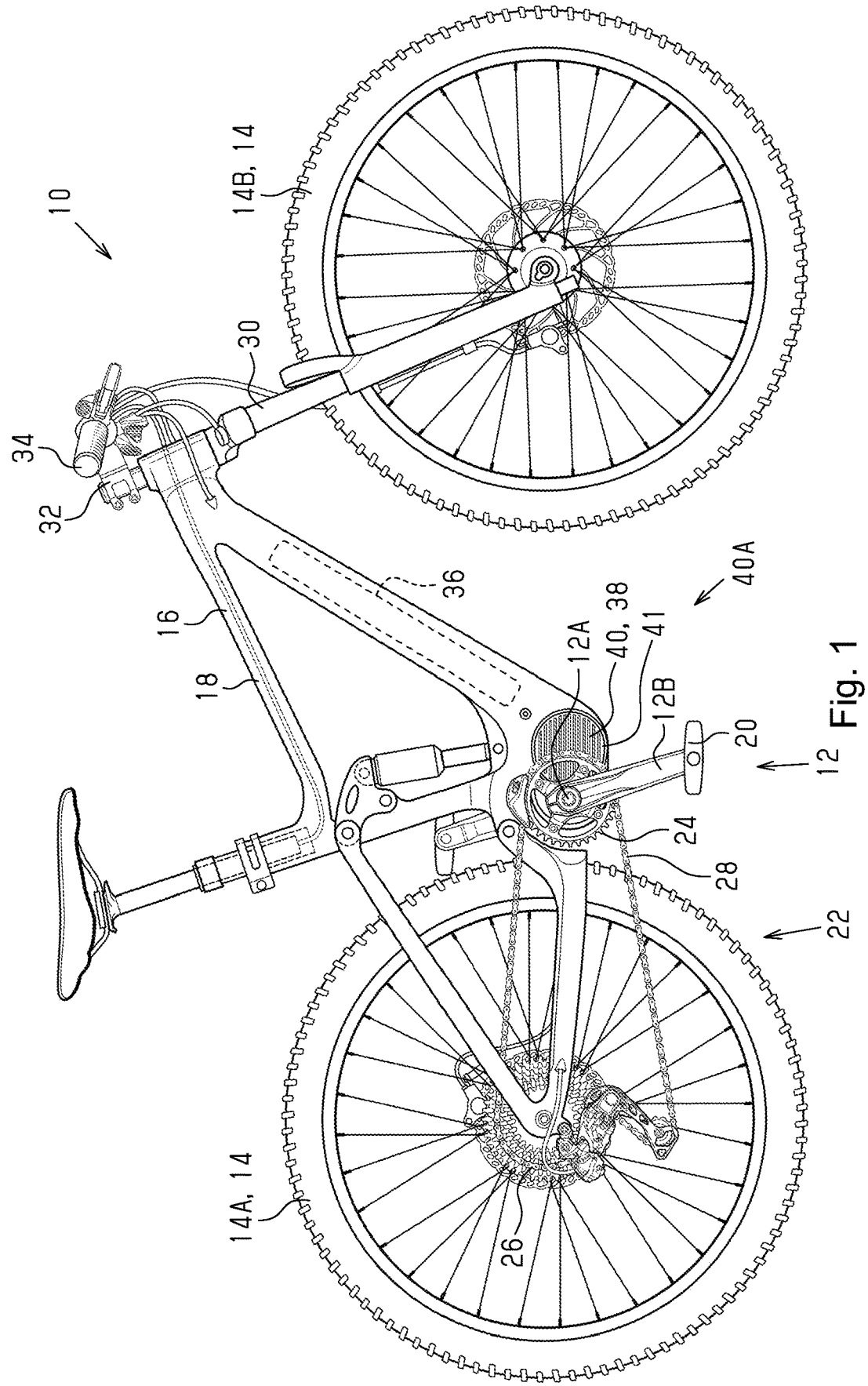
FIG. 1 is a side elevational view of a human-powered vehicle (e.g., a bicycle) including a human-powered vehicle control device for the human-powered vehicle in accordance with a first embodiment.
Figure 2:
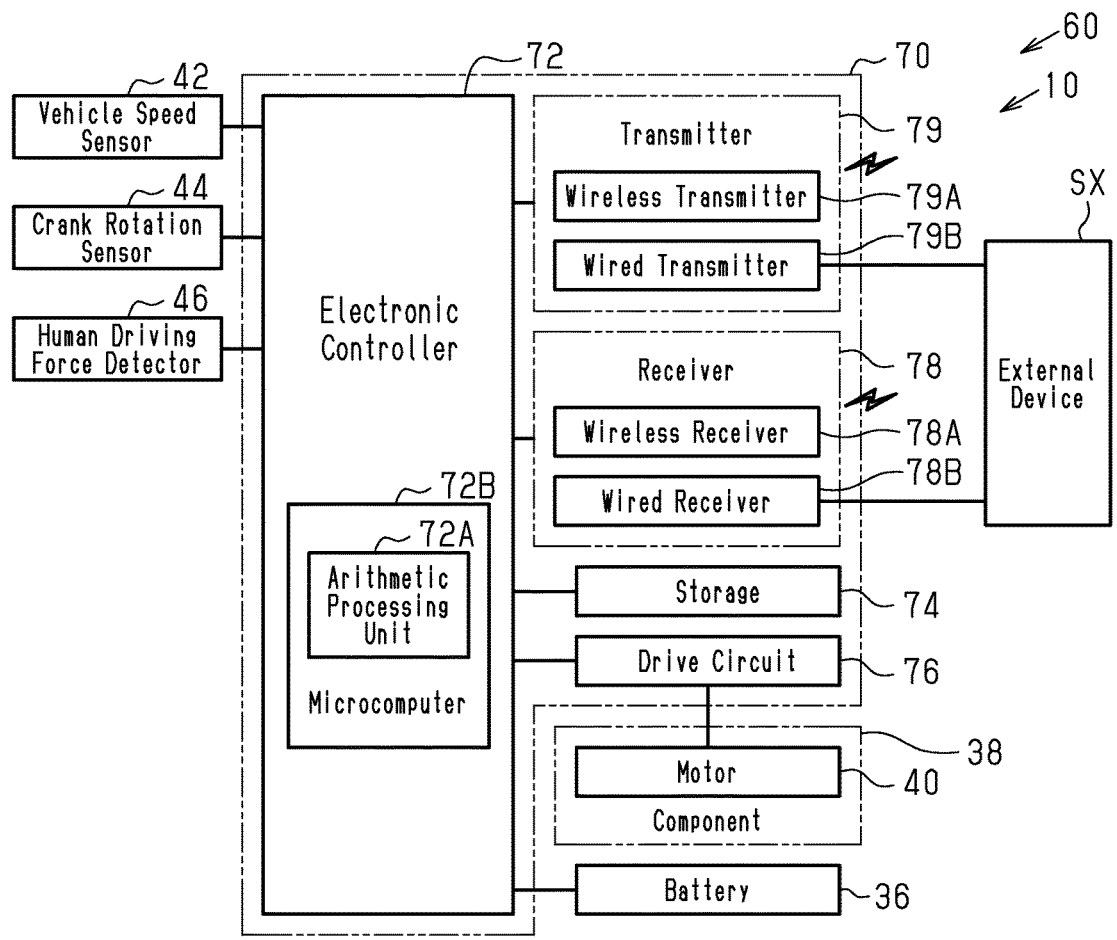
FIG. 2 is a block diagram showing the electrical configuration of the human-powered vehicle control device shown in FIG. 1.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a human-powered vehicle control device 70 for a human-powered vehicle, a server 90 that transmits information to a human-powered vehicle component, and a communication system 60 related to a human-powered vehicle will be described with reference to FIGS. 1 to 6. A human-powered vehicle 10 is a vehicle including at least one wheel, and is driven by at least human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including three or more wheels. The human-powered vehicle 10 is not limited to a vehicle configured to be driven only by the human driving force H. The human-powered vehicle 10 includes an E-bike that uses driving force of an electric motor in addition to the human driving force H for propulsion. The E-bike includes an electric assist bicycle that assists in propulsion with an electric motor. In the embodiments described below, the human-powered vehicle 10 refers to an electric assist bicycle.

The human-powered vehicle 10 includes a crank 12 into which the human driving force H is input. The human-powered vehicle 10 further includes a wheel 14 and a vehicle body 16. The wheel 14 includes a rear wheel 14A and a front wheel 14B. The vehicle body 16 includes a frame 18. The crank 12 includes an input rotational shaft 12A rotational relative to the frame 18 and two crank arms 12B respectively provided on opposite axial ends of the input rotational shaft 12A. Two pedals 20 are respectively coupled to the crank arms 12B. The rear wheel 14A is driven in accordance with rotation of the crank 12. The rear wheel 14A is supported by the frame 18. The crank 12 and the rear wheel 14A are linked by a drive mechanism 22. The drive mechanism 22 includes a first rotary body 24 coupled to the input rotational shaft 12A. The input rotational shaft 12A and the first rotary body 24 can be coupled so as to rotate integrally with each other or can be coupled via a first one-way clutch. The first one-way clutch is configured to rotate the first rotary body 24 forward in a case where the crank 12 rotates forward and allow the first rotary body 24 to rotate relative to the crank 12 in a case where the crank 12 rotates rearward. The first rotary body 24 includes a sprocket, a pulley, or a bevel gear. The drive mechanism 22 further includes a second rotary body 26 and a linking member 28. The linking member 28 transmits rotational force of the first rotary body 24 to the second rotary body 26. The linking member 28 includes, for example, a chain, a belt, or a shaft.

The second rotary body 26 is coupled to the rear wheel 14A. The second rotary body 26 includes a sprocket, a pulley, or a bevel gear. Preferably, a second one-way clutch is provided between the second rotary body 26 and the rear wheel 14A. The second one-way clutch is configured to rotate the rear wheel 14A forward in a case where the second rotary body 26 rotates forward and allow the rear wheel 14A to rotate relative to the second rotary body 26 in a case where the second rotary body 26 rotates rearward.

The front wheel 14B is coupled to the frame 18 by a front fork 30. A handlebar 34 is coupled to the front fork 30 by a stem 32. In the present embodiment, the rear wheel 14A is coupled to the crank 12 by the drive mechanism 22. However, at least one of the rear wheel 14A and the front wheel 14B can be coupled to the crank 12 by the drive mechanism 22.

Preferably, the human-powered vehicle 10 further includes a battery 36. The battery 36 includes one or more battery elements. The battery elements include a rechargeable battery. The battery 36 is configured to supply electric power to the human-powered vehicle control device 70. Preferably, the battery 36 is connected to an electronic controller 72 of the human-powered vehicle control device 70 to perform wired or wireless communication with the electronic controller 72. The term "electronic controller" as used herein refers to hardware that executes a software program, and does not include a human. Hereinafter, the electronic controller 82 will be referred to as "the controller 82" for the sake of brevity. The battery 36 is configured to communicate with the controller 72 through, for example, power line communication (PLC), a controller area network (CAN), or a universal asynchronous receiver/transmitter (UART).

The human-powered vehicle 10 includes a human-powered vehicle component 38. Preferably, the component 38 includes a motor 40. The motor 40 applies a propulsion force to the human-powered vehicle 10. The motor 40 assists in propulsion of the human-powered vehicle 10. The motor 40 includes one or more electric motors. The motor 40 is configured to transmit rotation to at least one of the front wheel 14B and a power transmission path of the human driving force H extending from the pedals 20 to the rear wheel 14A. The motor 40 is provided outside the power transmission path of the human driving force H extending from the pedals 20 to the rear wheel 14A. The motor 40 can be provided on the power transmission path of the human driving force H extending from the pedals 20 to the rear wheel 14A. The power transmission path of the human driving force H extending from the pedals 20 to the rear wheel 14A includes the rear wheel 14A. In the present embodiment, the motor 40 is provided on the frame 18 of the human-powered vehicle 10 and configured to transmit rotation to the first rotary body 24. The motor 40 is provided on a housing 41. The housing 41 is provided on the frame 18. The housing 41 is, for example, detachably attached to the frame 18. A drive unit 40A is configured to include the motor 40 and the housing 41, on which the motor 40 is provided. Preferably, a third one-way clutch is provided on the power transmission path between the motor 40 and the input rotational shaft 12A so that in a case where the input rotational shaft 12A is rotated in a direction in which the human-powered vehicle 10 travels forward, the rotational force of the crank 12 will not be transmitted to the motor 40. In a case where the motor 40 is provided on at least one of the rear wheel 14A and the front wheel 14B, the motor 40 can include a hub motor.

Preferably, the human-powered vehicle 10 includes at least part of the communication system 60 related to the human-powered vehicle 10. The communication system 60 includes the human-powered vehicle control device 70 and the server 90.

The human-powered vehicle control device 70 includes the controller 72. The controller 72 includes at least one arithmetic processing unit 72A (processor) that executes a predetermined control program. The arithmetic processing unit 72A includes, for example, a central processing unit (CPU) or a micro processing unit (MPU). When the controller 72 has more than one arithmetic processing unit 72A, the arithmetic processing units 72A can be provided at different positions separate from each other. The controller 72 can include one or more microcomputers 72B.

Preferably, the human-powered vehicle control device 70 includes a storage 74, which is also called a data storage device or a computer storage device. The storage 74 stores various control programs and information used for various control processes. The storage 74 can be any a non-transitory computer readable medium. The storage 74 includes, for example, a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Preferably, the human-powered vehicle control device 70 further includes a receiver 78. The receiver 78 is configured to receive various types of information. Preferably, the human-powered vehicle control device 70 further includes a transmitter 79. In an example, the receiver 78 includes a wireless receiver 78A. In another example, the receiver 78 includes a wired receiver 78B. The receiver 78 can include only one or both of the wireless receiver 78A and the wired receiver 78B. In an example, the transmitter 79 includes a wireless transmitter 79A. In another example, the transmitter 79 includes a wired transmitter 79B. The transmitter 79 can include only one or both of the wireless transmitter 79A and the wired transmitter 79B. At least part of the receiver 78 and at least part of the transmitter 79 can be configured to be a single communication unit. The communication unit includes at least one of a wireless communication unit and a wired communication unit. The communication unit can include only one of at least part of the receiver 78 and at least part of the transmitter 79. In a case where the communication unit includes only one of at least part of the receiver 78 and at least part of the transmitter 79, the communication unit can be configured to perform one-way communication through which the communication unit performs only one of reception of a signal from an external device SX and transmission of a signal to the external device SX. The receiver 78 can be configured to receive various types of information through the Internet. Preferably, the transmitter 79 is configured to transmit information stored in the storage 74 to the external device SX. The external device SX includes, for example, at least one of the server 90, a smartphone, and a personal computer. The external device SX can be configured to include, for example, at least one of the server 90, a smartphone, and a personal computer. The transmitter 79 transmits information stored in the storage 74 to the external device SX through at least one of wireless communication, wired communication, and the Internet or the like.

Preferably, the storage 74 stores limit information related to driving limitation of the motor 40. The receiver 78 receives limit information. Preferably, the receiver 78 receives various types of information from the external device SX. The receiver 78 receives various types of information from the external device SX through at least one of wireless communication, wired communication, and the Internet or the like. The controller 72 stores the limit information received by the receiver 78 in the storage 74. The controller 72 controls the motor 40 in accordance with the limit information. In a first control state, the controller 72 controls the motor 40 in accordance with the limit information.

Preferably, the human-powered vehicle control device 70 further includes a drive circuit 76 of the motor 40. Preferably, the drive circuit 76 and the controller 72 are provided on the housing of the drive unit. The drive circuit 76 and the controller 72 can be provided, for example, on the same circuit substrate. The controller 72 and the drive circuit 76 can be separate bodies. The controller 72 can include the drive circuit 76. The drive circuit 76 includes an inverter circuit. The drive circuit 76 controls electric power supplied from the battery 36 to the motor 40. The drive circuit 76 is connected to the controller 72 so as to perform wired or wireless communication with the controller 72. The drive circuit 76 drives the motor 40 in accordance with a control signal from the controller 72.

Preferably, the human-powered vehicle 10 further includes a vehicle speed sensor 42. Preferably, the human-powered vehicle 10 further includes at least one of a crank rotation sensor 44 and a human driving force detector 46. The term "sensor" as used herein also refers to a hardware device or instrument designed to detect the presence of a particular object or substance and to emit a signal in response. The term "sensor" as used herein also do not include a human.

The vehicle speed sensor 42 is configured to detect information corresponding to a rotational speed W of the wheel 14 of the human-powered vehicle 10. The vehicle speed sensor 42 is configured to detect, for example, a magnet provided on the wheel 14 of the human-powered vehicle 10. The vehicle speed sensor 42 is configured to, for example, output detection signals a predetermined number of times in one rotation of the wheel 14. The predetermined number of times is, for example, one. The vehicle speed sensor 42 outputs a signal corresponding to the rotational speed W of the wheel 14. The controller 72 calculates a vehicle speed V of the human-powered vehicle 10 based on the rotational speed W of the wheel 14 and information related to the perimeter of the wheel 14. The storage 74 stores information related to the perimeter of the wheel 14. The vehicle speed sensor 42 includes, for example, a magnetic reed forming a reed switch or a Hall element. The vehicle speed sensor 42 can be attached to a chainstay of the frame 18 of the human-powered vehicle 10 and configured to detect a magnet attached to the rear wheel 14A or can be provided on the front fork 30 and configured to detect a magnet attached to the front wheel 14B. In the present embodiment, the vehicle speed sensor 42 is configured so that the reed switch detects the magnet once in one rotation of the wheel 14. The vehicle speed sensor 42 is not limited to a configuration that detects a magnet provided on the wheel 14 and can be configured to include, for example, an optical sensor. The vehicle speed sensor 42 can include a GPS receiver. For example, the controller 72 obtains a vehicle speed by calculating a travel distance per unit time from signals received by the GPS receiver provided on a cycle computer, a smartphone, or the like. Alternatively, a cycle computer, a smartphone, or the like calculates a vehicle speed, and the controller 72 can be configured to obtain the vehicle speed calculated by the cycle computer, the smartphone, or the like. The vehicle speed sensor 42 is connected to the controller 72 via a wireless communication device or an electric cable.

The crank rotation sensor 44 is configured to detect information corresponding to a rotational speed NC of the input rotational shaft 12A. The crank rotation sensor 44 is provided, for example, on the frame 18 or the drive unit of the human-powered vehicle 10. The crank rotation sensor 44 is configured to include a magnetic sensor that outputs a signal corresponding to the strength of the magnetic field. An annular magnet having a magnetic field, the strength of which changes in the circumferential direction, is provided on the input rotational shaft 12A, a member that rotates in cooperation with the input rotational shaft 12A, or the power transmission path between the input rotational shaft 12A and the first rotary body 24. The member that rotates in cooperation with the input rotational shaft 12A can include an output shaft of the motor 40. The crank rotation sensor 44 outputs a signal corresponding to the rotational speed NC of the input rotational shaft 12A. The magnet can be provided on a member that rotates integrally with the input rotational shaft 12A in the power transmission path of the human driving force H between the input rotational shaft 12A and the first rotary body 24. For example, in a case where the first one-way clutch is not provided between the input rotational shaft 12A and the first rotary body 24, the magnet can be provided on the first rotary body 24. The crank rotation sensor 44 can include, for example, an optical sensor, an acceleration sensor, a gyro sensor, or a torque sensor instead of the magnetic sensor. The crank rotation sensor 44 is connected to the controller 72 by a wireless communication device or an electric cable.

The human driving force detector 46 includes, for example, a torque sensor. The torque sensor is configured to output a signal corresponding to torque applied to the crank 12 by the human driving force H. For example, in a case where the first one-way clutch is provided on the power transmission path, it is preferred that the torque sensor is provided at the upstream side of the first one-way clutch in the power transmission path. The torque sensor includes, for example, a strain sensor, a magnetostrictive sensor, or a pressure sensor. The strain sensor includes a strain gauge. The torque sensor is provided on a member included in the power transmission path or a member near the member included in the power transmission path. The member included in the power transmission path includes, for example, the input rotational shaft 12A, a member that transmits the human driving force H between the input rotational shaft 12A and the first rotary body 24, the crank arms 12B, and the pedals 20. The torque sensor is connected to the controller 72 by a wireless communication device or an electric cable. The human driving force detector 46 can have any configuration that obtains information related to the human driving force H and can include, for example, a sensor that detects pressure applied to the pedals 20 or a sensor that detects tension of a chain.

The controller 72 controls the motor 40 assisting in propulsion of the human-powered vehicle 10. The controller 72 is configured to control the motor 40 in accordance with the human driving force H that is input to the human-powered vehicle 10. The human driving force H can be expressed in human torque HT or human power HW. In a case where the human driving force H is expressed in the human power HW, the human driving force H is obtained by multiplying torque detected by the human driving force detector 46 and the rotational speed NC of the input rotational shaft 12A detected by the crank rotation sensor 44.

The controller 72 is configured to control the motor 40, for example, so that the ratio of an assist force M of the motor 40 to the human driving force H equals a predetermined ratio A. The predetermined ratio A does not have to be fixed and can change, for example, in accordance with the human driving force H, the vehicle speed V, or both the human driving force H and the vehicle speed V. The human driving force H and the assist force M can be expressed in torque or power. In a case where the human driving force H and the assist force M are expressed in torque, the human driving force H is referred to as human torque HT, and the assist force M is referred to as an assist torque TM. In a case the human driving force H and the assist force M are expressed in power, the human driving force H is referred to as a human power HW, and the assist force M is referred to as an assist power WM. In the description, the torque ratio of an output torque MT to the human torque HT of the human-powered vehicle 10 can be referred to as an assist ratio AT. The ratio of the assist power WM produced by the motor 40 to the human power HW can be referred to as an assist ratio AW.

The controller 72 is configured to control the motor 40, for example, in a mode selected from multiple modes that at least partially differ from each other in the correspondence relationship between the human driving force H and the ratio A. The human power HW is calculated by multiplying the human torque HT and the rotational speed NC of the input rotational shaft 12A. In a case where the output of the motor 40 is input to the power transmission path of the human driving force H through a speed reducer, an output of the speed reducer is used as the assist force M. In a case where the speed reducer is not provided, the assist power WM is calculated by multiplying an output torque of the motor 40 and a rotational speed of the motor 40. In a case where the speed reducer is provided, the assist power WM is calculated by multiplying an output torque of the speed reducer and an output rotational speed of the speed reducer. In a case where the speed reducer is provided, the storage 74 is configured to store information related to a reduction ratio of the speed reducer. The controller 72 calculates the output rotational speed of the speed reducer in accordance with the rotational speed of the motor 40 and the information related to the reduction ratio of the speed reducer. The storage 74 stores, for example, information indicating a relationship between a control instruction of the motor 40 and an output torque of the motor 40. The controller 72 calculates an output torque of the motor 40 in accordance with, for example, the information indicating the relationship between the control instruction of the motor 40 and the output torque of the motor 40 stored in the storage 74. The controller 72 calculates, for example, an output torque of the speed reducer in accordance with the output torque of the motor 40 and information related to the reduction ratio of the speed reducer. The controller 72 is configured to output the control instruction to the drive circuit 76 of the motor 40 in accordance with the human torque HT or the human power HW. The control instruction includes, for example, a torque instruction value. The multiple modes can include a mode in which the motor 40 is not driven.

The controller 72 is configured to control the motor 40 so that the assist force M becomes less than or equal to an upper limit value MX. In a case where the assist force M is expressed in torque, the controller 72 is configured to control the motor 40 so that the output torque MT becomes less than or equal to an upper limit value MTX. Preferably, the upper limit value MTX is in a range that is greater than or equal to 30 Nm and less than or equal to 90 Nm. The upper limit value MTX is, for example, 80 Nm. The upper limit value MTX is specified, for example, by an output property of the motor 40. In a case where the assist force M is expressed in power, the controller 72 is configured to control the motor 40 so that the assist power WM becomes less than or equal to an upper limit value MWX.

The controller 72 can be configured to control the motor 40 in accordance with the rotational speed NC of the input rotational shaft 12A in addition to the human driving force H. For example, in a case where the rotational speed NC of the input rotational shaft 12A is less than a predetermined rotational speed NCX, the controller 72 stops the driving of the motor 40 in accordance with at least one of the rotational speed NC of the input rotational shaft 12A and the human driving force H. The predetermined rotational speed NCX is, for example, 0 rpm. For example, in a case where the rotational speed NC of the input rotational shaft 12A becomes greater than or equal to a predetermined rotational speed NCY, the controller 72 can stop the motor 40 or control the motor 40 to decrease the assist force M. The predetermined rotational speed NCY is greater than a predetermined rotational speed NC and, for example, has a value in a range from 120 rpm to 200 rpm.

For example, in a case where the vehicle speed V becomes greater than or equal to a first vehicle speed V1, the controller 72 stops the motor 40. The first vehicle speed V1 is, for example, 25 km per hour. The first vehicle speed V1 can be less than 25 km per hour and can be, for example, 24 km per hour. The first vehicle speed V1 can be greater than 25 km per hour and can be, for example, 45 km per hour. Preferably, the controller 72 is configured to control the motor 40 so that at least one of the upper limit value MX and the ratio A decreases as the vehicle speed V increases in a range from a second vehicle speed V2 that is lower than the first vehicle speed V1 to the first vehicle speed V1.

The controller 72 controls the motor 40 in the first control state. Preferably, the controller 72 switches between the first control state and a second control state that controls the motor 40 differently from the first control state. Preferably, the first control state is a control state for a race. The first control state is configured so that the motor 40 of the human-powered vehicle 10 used in the same race is controlled under a predetermined condition.

Preferably, in the second control state, the controller 72 controls the motor 40 in accordance with at least one of a travel state of the human-powered vehicle 10 and a battery level of the battery 36. Preferably, in the first control state, the controller 72 does not control the motor 40 in accordance with the traveling state of the human-powered vehicle 10 and the battery level of the battery 36. In the first control state, the controller 72 can control the motor 40, for example, independently from both the travel state of the human-powered vehicle and the battery level of the battery 36. Preferably, in the first control state, the controller 72 controls the motor 40 regardless of the battery level of the battery 36 in a case where the battery level is greater than or equal to a predetermined level, and the controller 72 restricts output of the motor 40 or does not drive the motor 40 in a case where the battery level is less than the predetermined level. For example, in the second control state, the controller 72 changes output of the motor 40 in accordance with a first parameter related to the travel state, and in the first control state, the controller 72 does not change output of the motor 40 even in a case where the first parameter changes. For example, in the second control state, the controller 72 can be configured to change the motor 40 in accordance with changes in the first parameter related to the travel state and a second parameter, and in the first control state, the controller 72 can be configured not to change output of the motor 40 even in a case where the first parameter changes and also configured to change output of the motor 40 in a case where the second parameter changes. That is, the configuration of the controller 72 that does not control the motor 40 in accordance with the travel state of the human-powered vehicle 10 and the battery level in the first control state includes a configuration of the controller 72 that controls the motor 40 in the first control state regardless of at least one of the parameters related to the travel state and the battery level, which are used to control the motor 40 in the second control state. Preferably, in the second control state, the controller 72 controls the motor 40 so that output of the motor 40 becomes less than or equal to a predetermined output value. The predetermined output value includes at least one of the predetermined ratio A and the upper limit value MX.

Preferably, the first control state limits at least one of a first driving time of the motor 40 assisting in propulsion of the human-powered vehicle 10, a first driving number of times of the motor 40, a driving timing of the motor 40, a second driving time for driving the motor 40 so that output of the motor 40 becomes greater than or equal to the predetermined output value, and a second driving number of times for driving the motor 40 so that the output of the motor 40 becomes greater than or equal to the predetermined output value. Preferably, in the first control state, the controller 72 limits at least one of the first driving time, the first driving number of times, the driving timing, the second driving time, and the second driving number of times regardless of at least one of the travel state of the human-powered vehicle 10 and the battery level of the battery 36.

In a case where the first driving time of the motor 40 is limited in the first control state, the motor 40 is driven, for example, so that the first driving time of the motor 40 during a predetermined race is within a predetermined first accumulated time. In a case where an accumulated time of the first driving time of the motor 40 is greater than the predetermined first accumulated time in the first control state, the controller 72 does not drive the motor 40. In a case where the first driving time of the motor 40 is limited in the first control state, the motor 40 is driven, for example, so that a single continuous driving time of the motor 40 during the predetermined race is within a predetermined continuous driving time. In a case where the single continuous driving time of the motor 40 is greater than the predetermined continuous driving time in the first control state, the controller 72 stops the motor 40.

In a case where the first driving number of times of the motor 40 is limited in the first control state, the motor 40 is driven, for example, so that the first driving number of times of the motor 40 during the predetermined race is within a predetermined first number of times. In a case where the first driving number of times of the motor 40 reaches the predetermined first number of times in the first control state, the controller 72 does not drive the motor 40.

In a case where the driving timing of the motor 40 is limited in the first control state, the driving of the motor 40 is prohibited, for example, in a case where the travel state and a travel environment of the human-powered vehicle 10 satisfy a predetermined prohibition condition. The predetermined prohibition condition is satisfied, for example, in at least one of a case where the human-powered vehicle 10 travels in a predetermined area and a case where the human-powered vehicle 10 travels outside the predetermined area. For example, in a case where the human-powered vehicle 10 travels on a circuit course, the predetermined prohibition condition is satisfied in at least one of a case where the number of laps on the circuit course is a predetermined first number of laps, a case where the number of laps is less than a predetermined second number of laps, and a case where the number of laps is greater than or equal to a predetermined third number of laps. For example, in a case where the human-powered vehicle 10 travels on a circuit course, the predetermined prohibition condition can be satisfied in at least one of a case where the human-powered vehicle 10 is located in a predetermined area of the circuit course and a case where the human-powered vehicle 10 is located outside the circuit course.

In a case where the second driving time of the motor 40 is limited in the first control state, the motor 40 is driven, for example, so that a time for controlling output of the motor 40 to be greater than or equal to a predetermined output that is set in the second control state is within a predetermined second accumulated time. In the first control state, in a case where the time for controlling output of the motor 40 to be greater than or equal to the predetermined output exceeds the predetermined second accumulated time, the controller 72 drives the motor 40 so that the output of the motor 40 will not be greater than or equal the predetermined output.

In a case where the second driving number of times of the motor 40 is limited in the first control state, the motor 40 is driven, for example, so that the second driving number of times for controlling output of the motor 40 to be greater than or equal to a predetermined output that is set in the second control state is within a predetermined second number of times. In a case where the second driving number of times for controlling output of the motor 40 to be greater than or equal to the predetermined output set in the second control state reaches the predetermined second number of times, the controller 72 drives the motor 40 so that the output of the motor 40 will not be greater than or equal the predetermined output.

Preferably, in the first control state, in a case where a predetermined condition is satisfied, the controller 72 is switchable from the second control state to the first control state. Preferably, in the first control state, in a case where the predetermined condition is satisfied and predetermined information for switching from the first control state to the second control state is input, the controller 72 switches from the first control state to the second control state. Preferably, in the first control state, in a case where the predetermined condition is not satisfied and the predetermined information is input, the controller 72 maintains the first control state. Preferably, in the first control state, in a case where the predetermined condition is satisfied and the predetermined information is not input, the controller 72 maintains the first control state.

Preferably, the predetermined condition is satisfied in at least one of a case where an elapsed period from switching of the second control state to the first control state becomes longer than or equal to a predetermined elapsed period, a case where a predetermined time is reached, a case where traveling on a predetermined traveling route is completed, and a case where a predetermined spot is reached. The predetermined elapsed period includes, for example, a period until a predetermined race ends. The predetermined time includes, for example, a time at which the predetermined race ends. The case where traveling on the predetermined traveling route is completed includes, for example, a case where traveling on a traveling route of the predetermined race is completed. The predetermined spot includes, for example, at least one of a goal point of the predetermined race and a point outside a predetermined region. Preferably, the human-powered vehicle control device 70 includes at least one of a clock, a time receiver, and a global positioning system (GPS) receiver, and is configured to determine whether the predetermined condition is satisfied in accordance with information received by the clock, the time receiver, and the GPS receiver.

Preferably, the predetermined information includes at least one of a password and software for switching from the first control state to the second control state. The password is provided, for example, by an organizer of the predetermined race. The software is provided, for example, by the organizer of the predetermined race.

A method for controlling the component 38 includes a receiving process for receiving the limit information that limits usage of the component 38 from the external device SX, a storing process for storing the limit information received during the receiving process in the storage 74, and a controlling process for controlling the component 38 in accordance with the limit information stored in the storage 74 during the storing process. In the present embodiment, the component 38 includes the motor 40, and the method for controlling the motor 40 includes a receiving step for receiving limit information that limits usage of the motor 40 from the external device SX, a storing step for storing the limit information received during the receiving process in the storage 74, and a controlling process for controlling the motor 40 in accordance with the limit information stored in the storage 74 during the storing process. The limit information includes at least one of the first driving time of the motor 40, the first driving number of times of the motor 40, the driving timing of the motor 40, the second driving time of the motor 40, and the second driving number of times of the motor 40, which are used in the first control state.

The controller 72 is configured to switch to the first control state in a case where there is a request for switching to the first control state in the second control state. The request for switching to the first control state can be, for example, transmitted from the external device SX or can be set in accordance with an operation performed on an operating portion provided on the human-powered vehicle 10. The controller 72 can be configured to determine that there is a request for switching to the first control state in a case where the human-powered vehicle 10 enters a predetermined region and a case where a serial code is received from the external device SX.

Figure 4:
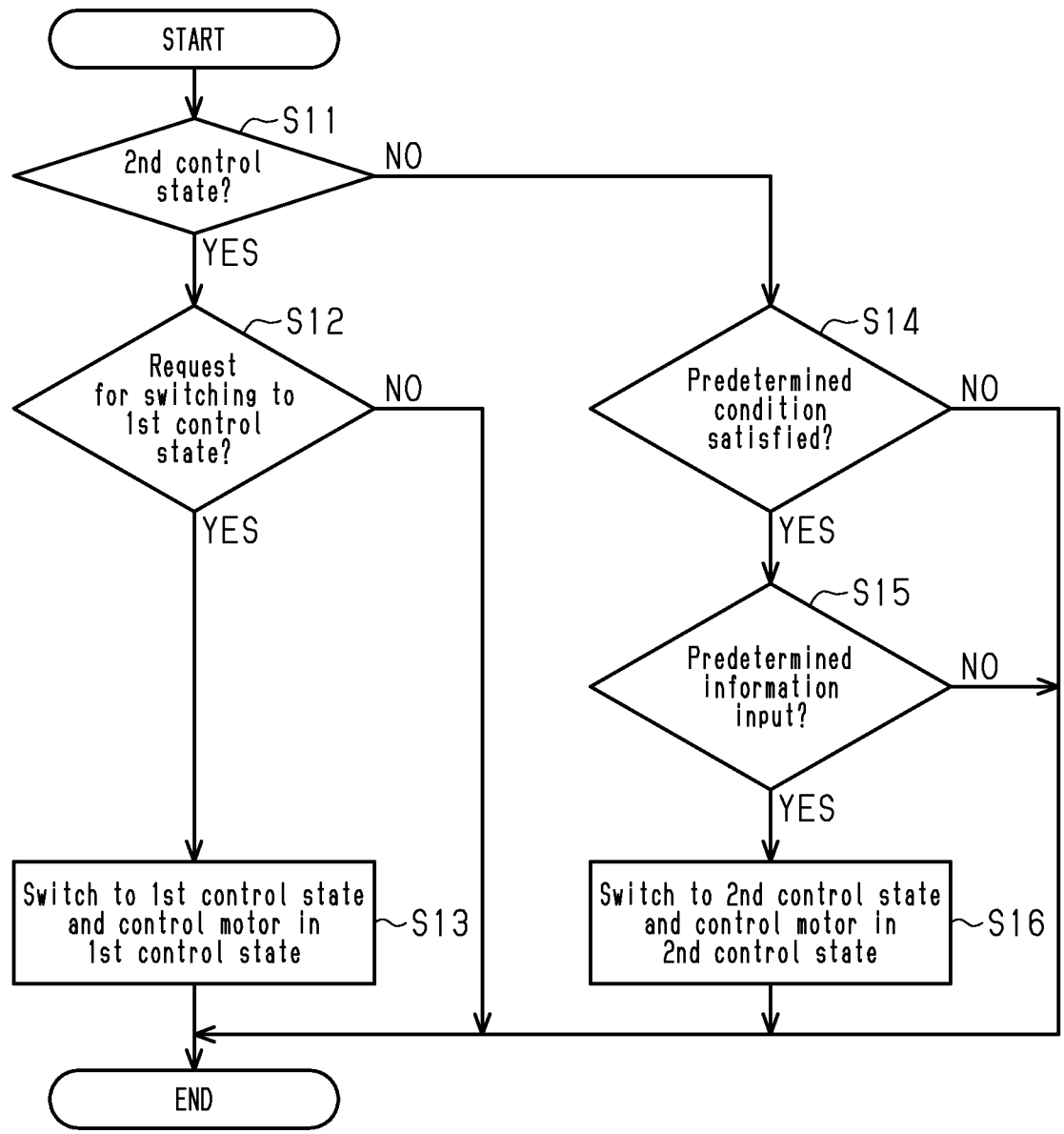
FIG. 4 is a flowchart of a process for switching a control state of a motor executed by the electronic controller shown in FIG. 2.

A process for switching the control state will now be described with reference to FIG. 4. In a case where electric power is supplied to the controller 72, the controller 72 starts the process and proceeds to step S11 of the flowchart illustrated in FIG. 4. In a case where the flowchart shown in FIG. 4 ends, the controller 72 repeats the process from step S11 after a predetermined interval until the supply of electric power is stopped.

In step S11, the controller 72 determines whether the control state is the second control state. In a case where the control state is the second control state, the controller 72 proceeds to step S12. In step S12, the controller 72 determines whether there is a request for switching to the first control state. In a case where there is no request for switching to the first control state, the controller 72 ends the process. In a case where there is a request for switching to the first control state, the controller 72 proceeds to step S13. In step S13, the controller 72 switches to the first control state, controls the motor 40 in the first control state, and ends the process. In a case of switching from the second control state to the first control state, the controller 72 is configured to control the motor 40 in the first control state until the control state is switched to the second control state.

In step S11, in a case where the control state is not the second control state, the controller 72 proceeds to step S14. In step S14, the controller 72 determines whether a predetermined condition is satisfied. In a case where the predetermined condition is not satisfied, the controller 72 ends the process. In a case where the predetermined condition is satisfied, the controller 72 proceeds to step S15.

In step S15, the controller 72 determines whether the predetermined information is input. In a case where the predetermined information is not input, the controller 72 ends the process. In a case where the predetermined information is input, the controller 72 proceeds to step S16. In step S16, the controller 72 switches to the second control state, controls the motor 40 in the second control state, and ends the process. In a case of switching from the first control state to the second control state, the controller 72 is configured to control the motor 40 in the second control state until the control state is again switched to the first control state.

Preferably, the controller 72 stores information related to which one of the first control state and the second control state is selected in the storage 74. Preferably, the controller 72 outputs the information related to which one of the first control state and the second control state is selected to the external device SX. The external device SX, which receives information related to which one of the first control state and the second control state is selected, includes, for example, at least one of the server 90 and an electronic device provided in the predetermined region and configured to communicate with the controller 72. The electronic device can be connected to the server 90 so as to communicate with the server 90 and configured to exchange various types of information with the server 90. For example, in a state where the external device SX is connected to the controller 72, in a case where a request signal is received from the external device SX for information related to which one of the first control state and the second control state is stored in the storage 74, the controller 72 transmits the information related to which one of the first control state and the second control state stored in storage 74 to the external device SX. The state where the external device SX is connected to the controller 72 includes, for example, at least one of a state where the external device SX is in communication with the controller 72 and a state where the external device SX can communicate with the controller 72. The controller 72 transmits information related to which one of the first control state and the second control state is selected to the external device SX, for example, at each predetermined timing. In a case where the controller 72 transmits information related to which one of the first control state and the second control state is selected to the external device SX, the controller 72 transmits, for example, information to the external device SX using the wireless transmitter 79A of the human-powered vehicle control device 70.

Preferably, the receiver 78 receives control information for controlling the component 38 of the human-powered vehicle 10, the storage 74 is configured to store the control information, and the controller 72 stores the control information received by the receiver 78 in the storage 74. In a case where a condition for participating in a predetermined race is satisfied, the controller 72 stores the control information received by the receiver 78 in the storage 74. Preferably, the condition for participating in the predetermined race is satisfied in a case where information related to entry of the predetermined race is stored in the storage 74. The information related to entry of the predetermined race is satisfied, for example, in a case where application software related to the predetermined race is installed in the storage 74. The information related to entry of the predetermined race is satisfied, for example, in a case where an identification number of the entry is stored in the storage 74. Preferably, the information related to entry of the predetermined race is stored in advance in the storage 74 by a user.

Figure 5:
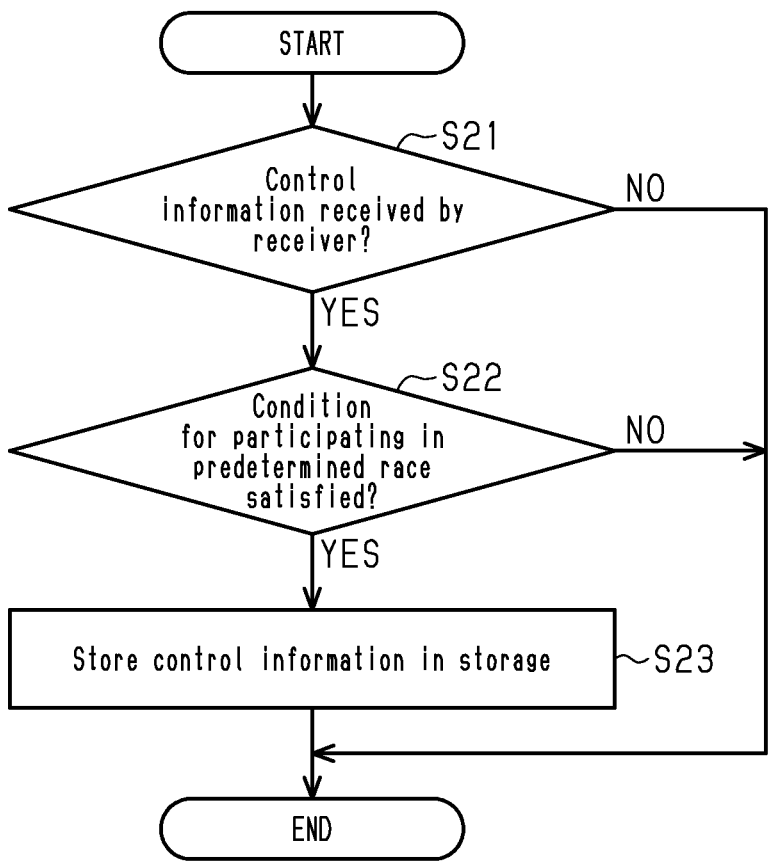
FIG. 5 is a flowchart of a process for storing control information executed by the electronic controller shown in FIG. 2.

A process for storing the control information will now be described with reference to FIG. 5. In a case where electric power is supplied to the controller 72, the controller 72 starts the process and proceeds to step S21 of the flowchart illustrated in FIG. 5. In a case where the flowchart shown in FIG. 5 ends, the controller 72 repeats the process from step S21 after a predetermined interval until the supply of electric power is stopped.

In step S21, the controller 72 determines whether the receiver 78 receives control information. In a case where the control information is not received by the receiver 78, the controller 72 ends the process. In a case where the control information is received by the receiver 78, the controller 72 proceeds to step S22. In step S22, the controller 72 determines whether the condition for participating in the predetermined race is satisfied. In a case where the condition for participating in the predetermined race is not satisfied, the controller 72 ends the process. In a case where the condition for participating in the predetermined race is satisfied, the controller 72 proceeds to step S23. In step S23, the controller 72 stores the control information in the storage 74 and ends the process.

Figure 3:
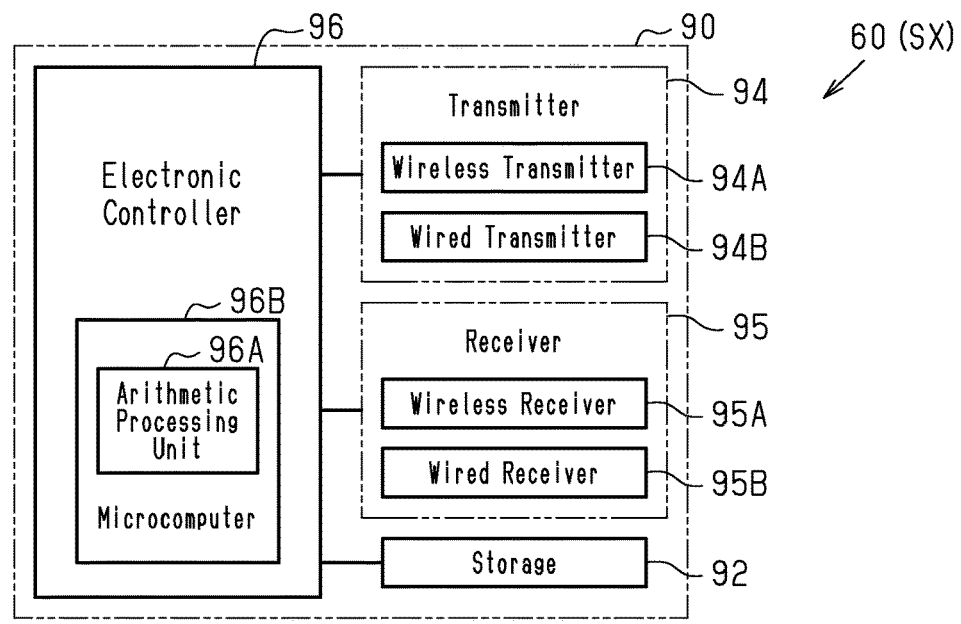
FIG. 3 is a block diagram showing the electrical configuration of a server that transmits information to the human-powered vehicle of the first embodiment.

The configuration of the server 90 will now be described with reference to FIG. 3. The server 90 transmits information to the component 38. Preferably, the server 90 transmits information. The server 90 can directly transmit information to the component 38 or can transmit information to the component 38 via a terminal that is connected to the server 90 so as to communicate with the server 90. For example, the server 90 transmits information to the component 38 via an application installed in the terminal connected to the server 90 so as to communicate with the server 90. The terminal connected to the server 90 so as to communicate with the server 90 includes, for example, at least one of a smartphone and a personal computer.

The component 38 includes the motor 40. The server 90 includes a storage 92, a transmitter 94, and an electronic controller 96. Hereinafter, the electronic controller 96 will be referred to as "the controller 96" for the sake of brevity. The storage 92 stores control information for controlling the component 38. The transmitter 94 transmits the control information stored in the storage 92, which is also called a data storage device or a computer storage device. The server 90 transmits the control information stored in the storage 92 to the terminal, for example, through at least one of wireless communication, wired communication, and the Internet or the like.

The storage 92 stores various control programs and information used for various control processes. The storage 92 can be any a non-transitory computer readable medium. The storage 92 includes, for example, a nonvolatile memory and a volatile memory. The nonvolatile memory includes, for example, at least one of a ROM, an EPROM, an EEPROM, and a flash memory. The volatile memory includes, for example, RAM.

Preferably, the server 90 further includes a receiver 95. The receiver 95 is configured to receive various types of information. The transmitter 94 is configured to transmit various types of information. In an example, the transmitter 94 includes a wireless transmitter 94A. In another example, the transmitter 94 includes a wired transmitter 94B. The transmitter 94 can include only one or both of the wireless transmitter 94A and the wired transmitter 94B. In an example, the receiver 95 includes a wireless receiver 95A. In another example, the receiver 95 includes a wired receiver 95B. The receiver 95 can include only one or both of the wireless receiver 95A and the wired receiver 95B. At least part of the receiver 95 and at least part of the transmitter 94 can be configured to be a single communication unit. The communication unit includes at least one of a wireless communication unit and a wired communication unit. The communication unit can include only one of at least part of the receiver 95 and at least part of the transmitter 94. In a case where the communication unit includes only one of at least part of the receiver 95 and at least part of the transmitter 94, the communication unit can be configured to perform one-way communication through which the communication unit performs only one of reception of a signal from the terminal, which is connected to the server 90 so as to communicate with the server 90, and transmission of a signal to the terminal. The transmitter 94 can be configured to transmit control information through the Internet. Preferably, the transmitter 94 is configured to transmit control information to the terminal connected to the server 90 so as to communicate with the server 90. Preferably, the receiver 95 is configured to receive various types of information from the terminal connected to the server 90 so as to communicate with the server 90. The server 90 can be configured to communicate with the component 38 via the terminal connected to the server 90 so as to communicate with the server 90. The transmitter 94 and the receiver 95 can be configured to communicate with the component 38 via the terminal. The server 90 and the terminal can be connected by wired communication or wireless communication. The terminal can be configured to store information received from the server 90 and the controller 72 and transmit the stored information to the server 90 and the controller 72.

Preferably, the storage 74 stores limit information related to driving limitation of the motor 40. The receiver 78 receives limit information. Preferably, the receiver 78 receives various types of information from the external device SX. The receiver 78 receives various types of information from the external device SX through at least one of wireless communication, wired communication, and the Internet or the like. The controller 72 stores the limit information received by the receiver 78 in the storage 74. The controller 72 controls the motor 40 in accordance with the limit information. In the first control state, the controller 72 controls the motor 40 in accordance with the limit information.

The controller 96 includes at least one arithmetic processing unit 96A that executes a predetermined control program. The arithmetic processing unit 96A includes, for example, a CPU or an MPU. When the controller 96 has more than one arithmetic processing unit 96A, the arithmetic processing units 96A can be provided at different positions separate from each other. The controller 96 can include one or more microcomputers 96B.

Preferably, the controller 96 controls the transmitter 94. Preferably, the control information includes the limit information related to driving limitation of the motor 40. Preferably, the control information includes information corresponding to model numbers of the components 38 of the human-powered vehicles 10. Preferably, the control information includes limit information corresponding to the model number of the component 38. In a case where the control information includes the limit information corresponding to the model number of the component 38, the controller 72 can execute control in accordance with limit information corresponding to the model number of the component 38. The controller 96 of the server 90 can select limit information corresponding to the model number of the component 38 to which information is transmitted, and transmit, to the component 38, control information including only the control information corresponding to the model number of the component 38 to which information is transmitted. In a case of selecting the limit information corresponding to the model number of the component 38 to which information is transmitted, the controller 96 of the server 90 can select limit information corresponding to the model number of the component 38 in accordance with information that is input through an operating terminal or can select limit information corresponding to the model number of the component 38 that is obtained through communication with the component 38.

The controller 96 of the server 90 is configured to control the transmitter 94 to transmit control information to the component 38 that satisfies the condition for participating in the predetermined race.

In a first example, the condition for participating in the predetermined race is satisfied in a case where information related to entry of the predetermined race is stored in the storage 74 of the component 38. The information related to entry of the predetermined race includes, for example, application software of the predetermined race. The information related to entry of the predetermined race can be a serial code that is set for each component 38. Preferably, the serial code is stored in the storage 74 at the time of shipping the human-powered vehicle control device 70. The serial code is, for example, registered in advance to the server 90 by a user and stored in the storage 92 of the server 90. In a case where the serial code of the component 38 conforms to a serial code stored in the storage 92, the controller 96 of the server 90 determines that the component 38 satisfies the condition for participating in the predetermined race.

In a second example, the condition for participating in the predetermined race includes at least one of a case where the component 38 of the human-powered vehicle 10 can receive information transmitted from the transmitter 94 in a predetermined time slot and a case where the component 38 of the human-powered vehicle 10 is located in a predetermined area. The predetermined time slot includes, for example, a time slot in which the predetermined race is held and a preparation time before the predetermined race starts. The predetermined area includes a region holding the predetermined race.

Figure 6:
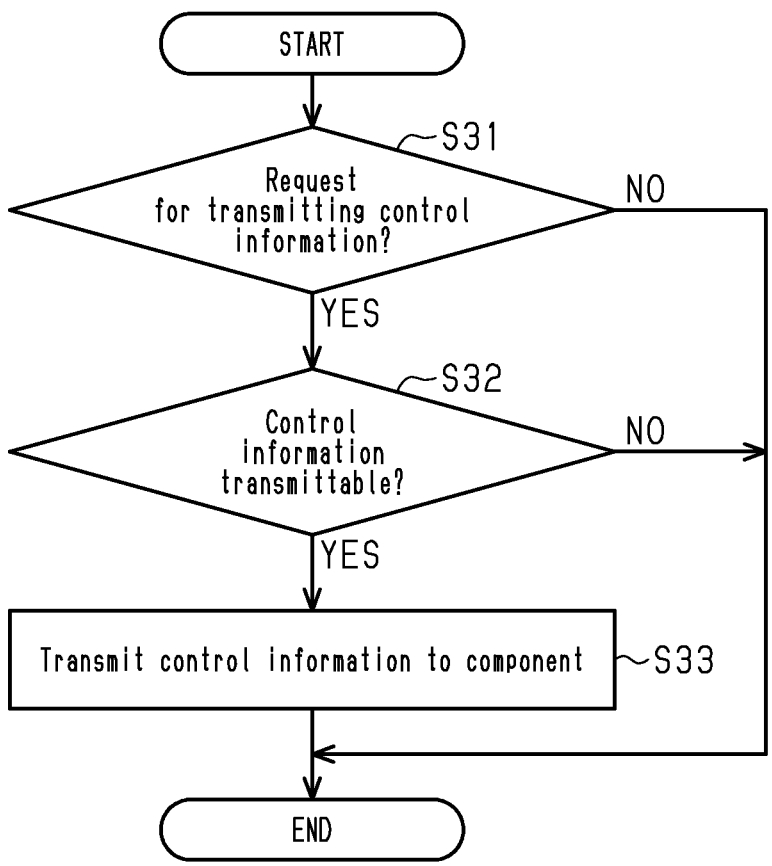
FIG. 6 is a flowchart of a process for transmitting control information executed by the electronic controller shown in FIG. 3.

A process of the server 90 for transmitting control information will now be described with reference to FIG. 6. In a case where electric power is supplied to the controller 96, the controller 96 starts the process and proceeds to step S31 of the flowchart illustrated in FIG. 6. In a case where the flowchart shown in FIG. 6 ends, the controller 96 repeats the process from step S31 after a predetermined interval until the supply of electric power is stopped.

In step S31, the controller 96 determines whether there is a request for transmitting control information. The request for transmitting control information is, for example, set in accordance with operation of an operating portion connected to the server 90. In a case where the server 90 is connected to the component 38 so as to communicate with the component 38 via a terminal, the request for transmitting control information can be set in accordance with operation of an operating portion of the terminal. In a case where there is no request for transmitting control information, the controller 96 ends the process. In a case where there is the request for transmitting control information, the controller 96 proceeds to step S32.

In step S32, the controller 96 determines whether the control information is transmittable. The controller 96 determines that the control information is transmittable, for example, in a state that allows communication with the component 38 directly or via a terminal. The controller 96 determines that the control information is transmittable, for example, in a case where communication can be performed with the component 38 directly or via a terminal and the information related to entry of the predetermined race is stored the storage 74 of the component 38. In a case where the control information is not transmittable, the controller 96 ends the process. In a case where the control information is transmittable, the controller 96 proceeds to step S33. In step S33, the controller 96 transmits the control information to the component 38 and ends the process.

Second Embodiment

Figure 7:
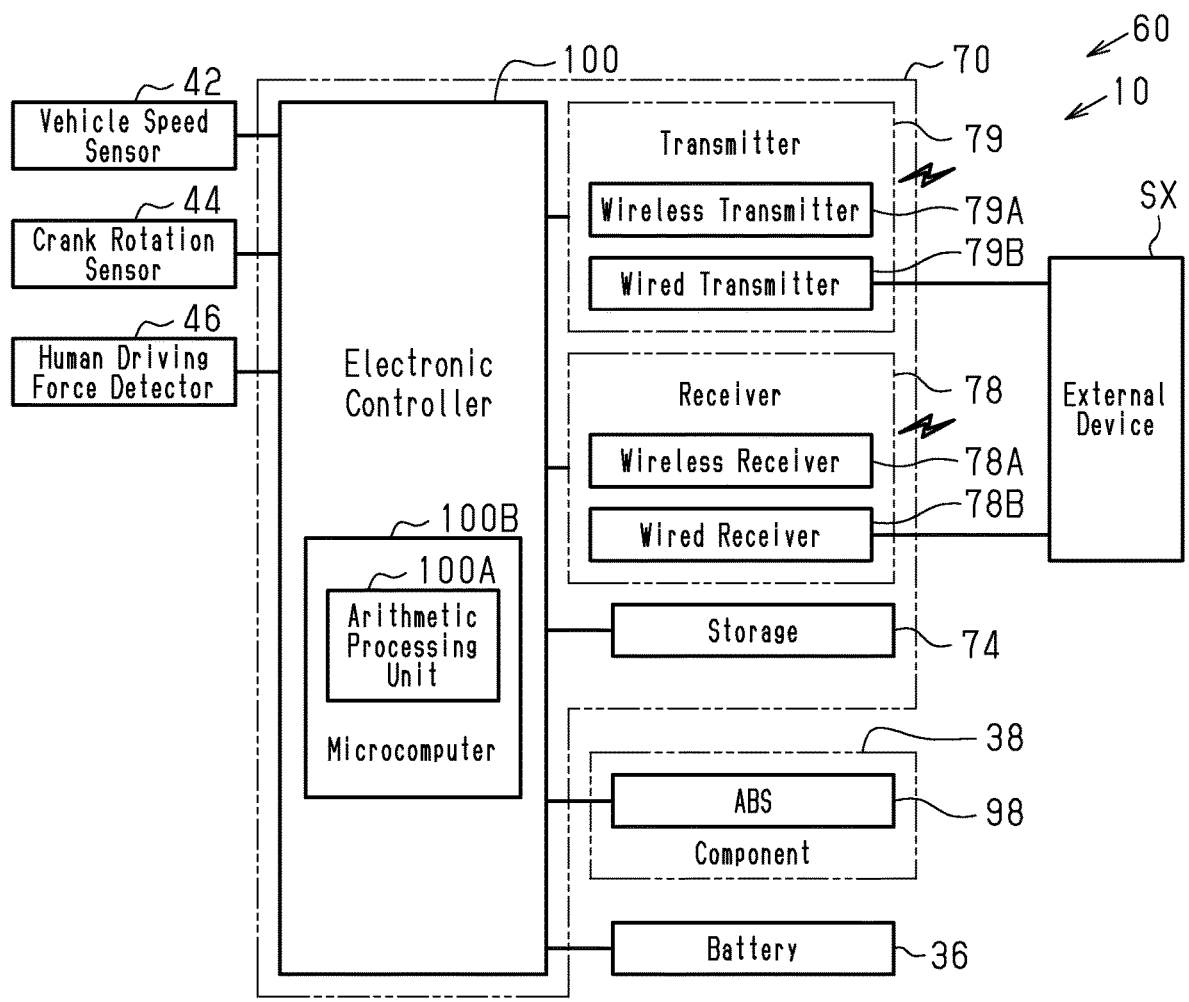
FIG. 7 is a block diagram showing the electrical configuration of a human-powered vehicle control device for a human-powered vehicle in accordance with a second embodiment.
Figure 8:
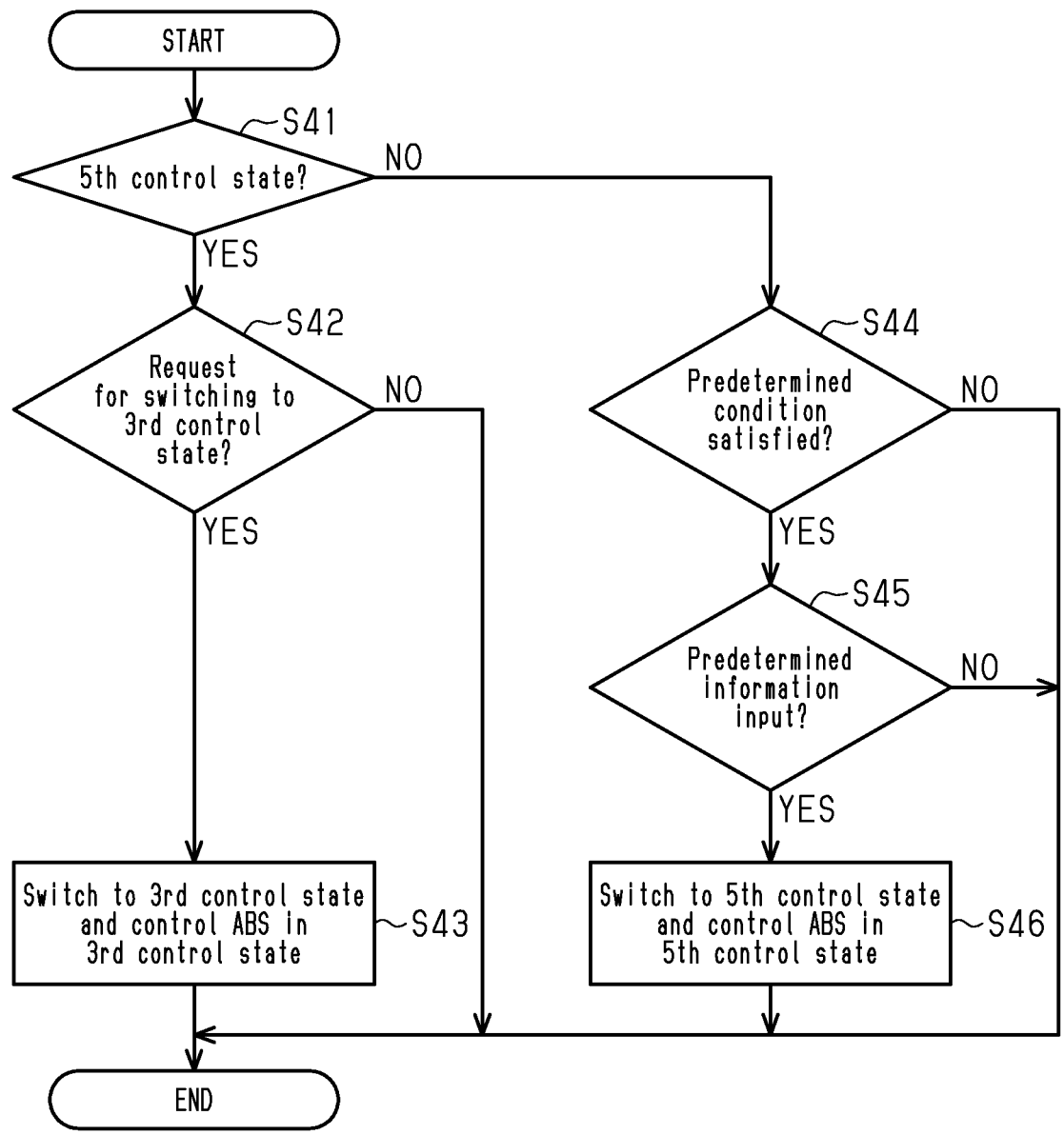
FIG. 8 is a flowchart of a process for switching a control state of an ABS executed by the electronic controller shown in FIG. 7.

A second embodiment of a human-powered vehicle control device 70 will now be described with reference to FIGS. 7 and 8. The human-powered vehicle control device 70 of the second embodiment is the same as the human-powered vehicle control device 70 of the first embodiment except that the human-powered vehicle control device 70 of the second embodiment controls an ABS 98 instead of the motor 40. Thus, the same reference characters are given to those components that are the same as the corresponding components of the first embodiment. Such components will not be described in detail. ABS is an abbreviated expression of an antilock brake system.

Preferably, the human-powered vehicle control device 70 includes an electronic controller 100. Hereinafter, the electronic controller 100 will be referred to as "the controller 100" for the sake of brevity. The controller 100 includes at least one arithmetic processing unit 100A that executes a predetermined control program. The arithmetic processing unit 100A includes, for example, a CPU or an MPU. When the controller 100 has more than one arithmetic processing unit 100A, the arithmetic processing units 100A can be provided at different positions separate from each other. The controller 100 can include one or more microcomputers 100B. Preferably, the controller 72 includes the controller 100. In other words, the controller 72 and the controller 100 can be integrated together to control both the motor 40 and the ABS 98. Alternatively, one of the controller 72 and the controller 100 can be used to control both the motor 40 and the ABS 98.

In the present embodiment, the component 38 includes the ABS 98. The controller 100 is configured to control the ABS 98. The controller 100 is configured to control the ABS 98 in a third control state. Preferably, the controller 100 is configured to be switchable between the third control state and a fifth control state that controls the ABS 98 differently from the third control state. Preferably, the third control state is a control state for a race. The third control state is configured so that the ABS 98 of the human-powered vehicle 10 used in the same race is controlled under a predetermined condition.

Preferably, in the fifth control state, the controller 100 is configured to control the ABS 98 in accordance with at least one of the travel state of the human-powered vehicle 10 and the battery level. Preferably, in the fifth control state, the controller 100 does not limit at least one of an operation time of the ABS 98, an operation number of times of the ABS 98, and an operation timing of the ABS 98.

Preferably, in the third control state, the controller 100 limits at least one of the operation time of the ABS 98, the operation number of times of the ABS 98, and the operation timing of the ABS 98.

In a case where the operation time of the ABS 98 is limited in the third control state, the ABS 98 is driven, for example, so that the operation time of the ABS 98 during a predetermined race is within a predetermined third accumulated time. In a case where an accumulated time of the operation time of the ABS 98 is greater than the predetermined third accumulated time in the third control state, the controller 100 does not drive the ABS 98. In a case where the operation time of the ABS 98 is limited in the third control state, the ABS 98 is driven, for example, so that a single continuous operation time of the ABS 98 during the predetermined race is within a predetermined second continuous operation time. In a case where a single operation time of the ABS 98 is greater than the predetermined second continuous operation time in the third control state, the controller 100 stops the ABS 98.

In a case where the operation number of times of the ABS 98 is limited in the third control state, the ABS 98 is driven, for example, so that the operation number of times of the ABS 98 during the predetermined race is within a predetermined third number of times. In a case where the operation number of times of the ABS 98 becomes the predetermined third number of times in the third control state, the controller 100 does not drive the ABS 98.

In a case where the operation timing of the ABS 98 is limited in the third control state, the driving of the ABS 98 is prohibited, for example, in a case where the travel state and the travel environment of the human-powered vehicle 10 satisfy a predetermined prohibition condition. The predetermined prohibition condition is satisfied, for example, in at least one of a case where the human-powered vehicle 10 travels in a predetermined area and a case where the human-powered vehicle 10 travels outside the predetermined area. For example, in a case where the human-powered vehicle 10 travels on a circuit course, the predetermined prohibition condition is satisfied in at least one of a case where the number of laps on the circuit course is a predetermined first number of laps, a case where the number of laps is less than a predetermined second number of laps, and a case where the number of laps is greater than or equal to a predetermined third number of laps. For example, in a case where the human-powered vehicle 10 travels on a circuit course, the predetermined prohibition condition can be satisfied in at least one of a case where the human-powered vehicle 10 is located in a predetermined area of the circuit course and a case where the human-powered vehicle 10 is located outside the circuit course.

Preferably, in the third control state, in a case where a predetermined condition is satisfied, the controller 100 is switchable from the third control state to the fifth control state. Preferably, in the third control state, in a case where the predetermined condition is satisfied and predetermined information for switching from the third control state to the fifth control state is input, the controller 100 switches from the third control state to the fifth control state. Preferably, in the third control state, in a case where the predetermined condition is not satisfied and the predetermined information is input, the controller 100 maintains the third control state. Preferably, in the third control state, in a case where the predetermined condition is satisfied and the predetermined information is not input, the controller 100 maintains the third control state.

Preferably, the predetermined condition is satisfied in at least one of a case where an elapsed period from switching of the fifth control state to the third control state becomes longer than or equal to a predetermined elapsed period, a case where a predetermined time is reached, a case where traveling on a predetermined traveling route is completed, and a case where a predetermined spot is reached. The predetermined elapsed period includes, for example, a period until a predetermined race ends. The predetermined time includes, for example, a time at which the predetermined race ends. The case where traveling on a predetermined traveling route is completed includes, for example, a case where traveling on a traveling route of the predetermined race is completed. The predetermined spot includes, for example, at least one of a goal point of the predetermined race and a point outside a predetermined region. Preferably, the human-powered vehicle control device 70 includes at least one of a clock, a time receiver, and a GPS receiver, and is configured to determine whether the predetermined condition is satisfied in accordance with information received by the clock, the time receiver, and the GPS receiver.

Preferably, the predetermined information includes at least one of a password and software for switching from the third control state to the fifth control state. The password is provided, for example, by an organizer of the predetermined race. The software is provided, for example, by the organizer of the predetermined race.

The controller 100 is configured to switch to the third control state in a case where there is a request for switching to the third control state in the fifth control state. The request for switching to the third control state can be, for example, transmitted from the external device SX or can be set in accordance with an operation performed on an operating portion provided on the human-powered vehicle 10.

A process for switching the control state will now be described with reference to FIG. 8. In a case where electric power is supplied to the controller 100, the controller 100 starts the process and proceeds to step S41 of the flowchart shown in FIG. 8. In a case where the flowchart shown in FIG. 8 ends, the controller 100 repeats the process from step S41 after a predetermined interval until the supply of electric power is stopped.

In step S41, the controller 100 determines whether the control state is the fifth control state. In a case where the control state is the fifth control state, the controller 100 proceeds to step S42. In step S42, the controller 100 determines whether there is a request for switching to the third control state. In a case where there is no request for switching to the third control state, the controller 100 ends the process. In a case where there is a request for switching to the third control state, the controller 100 proceeds to step S43. In step S43, the controller 100 switches to the third control state, controls the ABS 98 in the third control state, and ends the process. In a case of switching from the fifth control state to the third control state, the controller 100 is configured to control the ABS 98 in the third control state until the control state is switched to the fifth control state.

In step S41, in a case where the control state is not the fifth control state, the controller 100 proceeds to step S44. In step S44, the controller 100 determines whether a predetermined condition is satisfied. In a case where the predetermined condition is not satisfied, the controller 100 ends the process. In a case where the predetermined condition is satisfied, the controller 100 proceeds to step S45.

In step S45, the controller 100 determines whether the predetermined information is input. In a case where the predetermined information is not input, the controller 100 ends the process. In a case where the predetermined information is input, the controller 100 proceeds to step S46. In step S46, the controller 100 switches to the fifth control state, controls the ABS 98 in the fifth control state, and ends the process. In a case of switching from the third control state to the fifth control state, the controller 100 is configured to control the ABS 98 in the fifth control state until the control state is again switched to the third control state.

Third Embodiment

Figure 9:
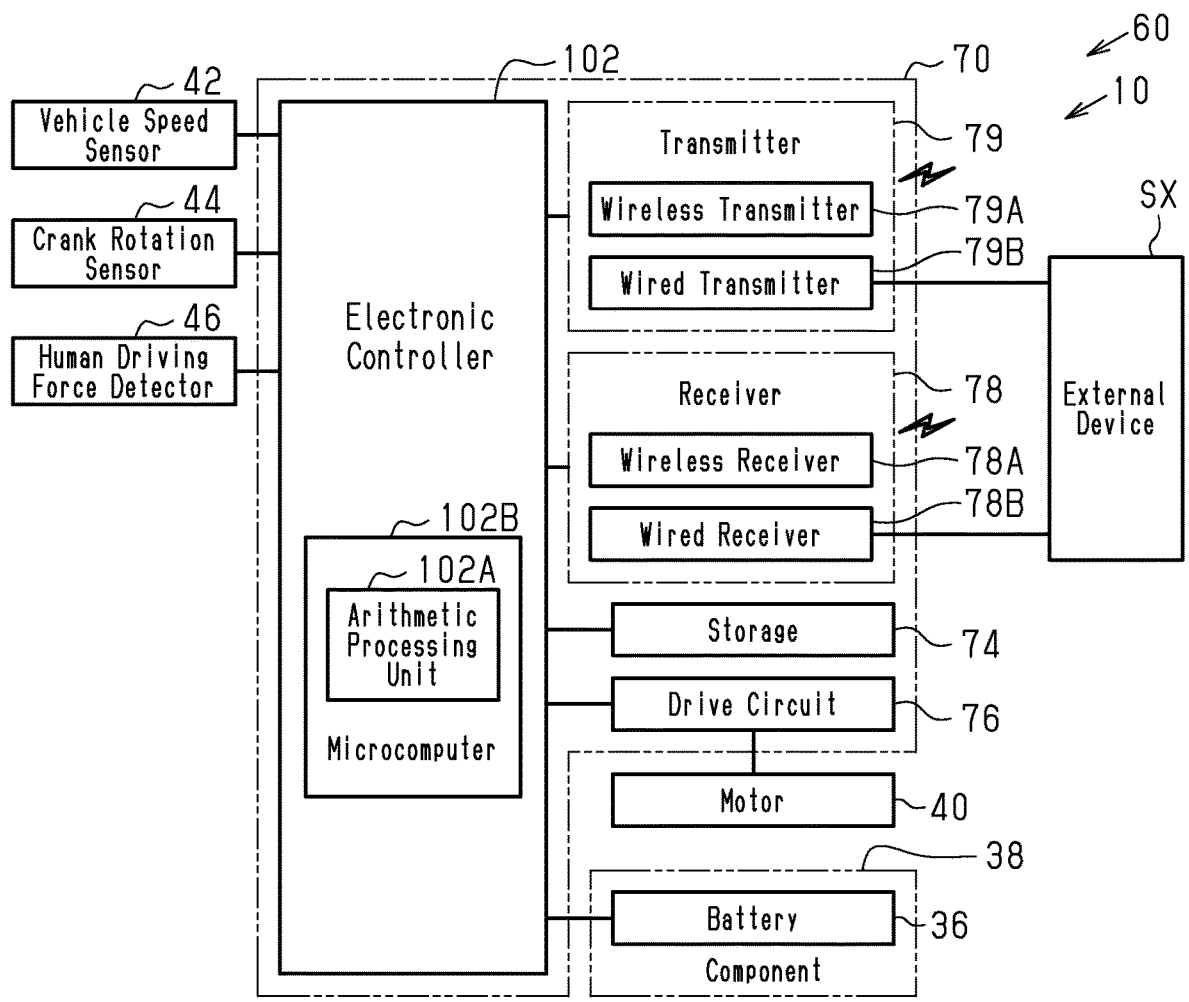
FIG. 9 is a block diagram showing the electrical configuration of a human-powered vehicle control device for a human-powered vehicle in accordance with a third embodiment.
Figure 10:
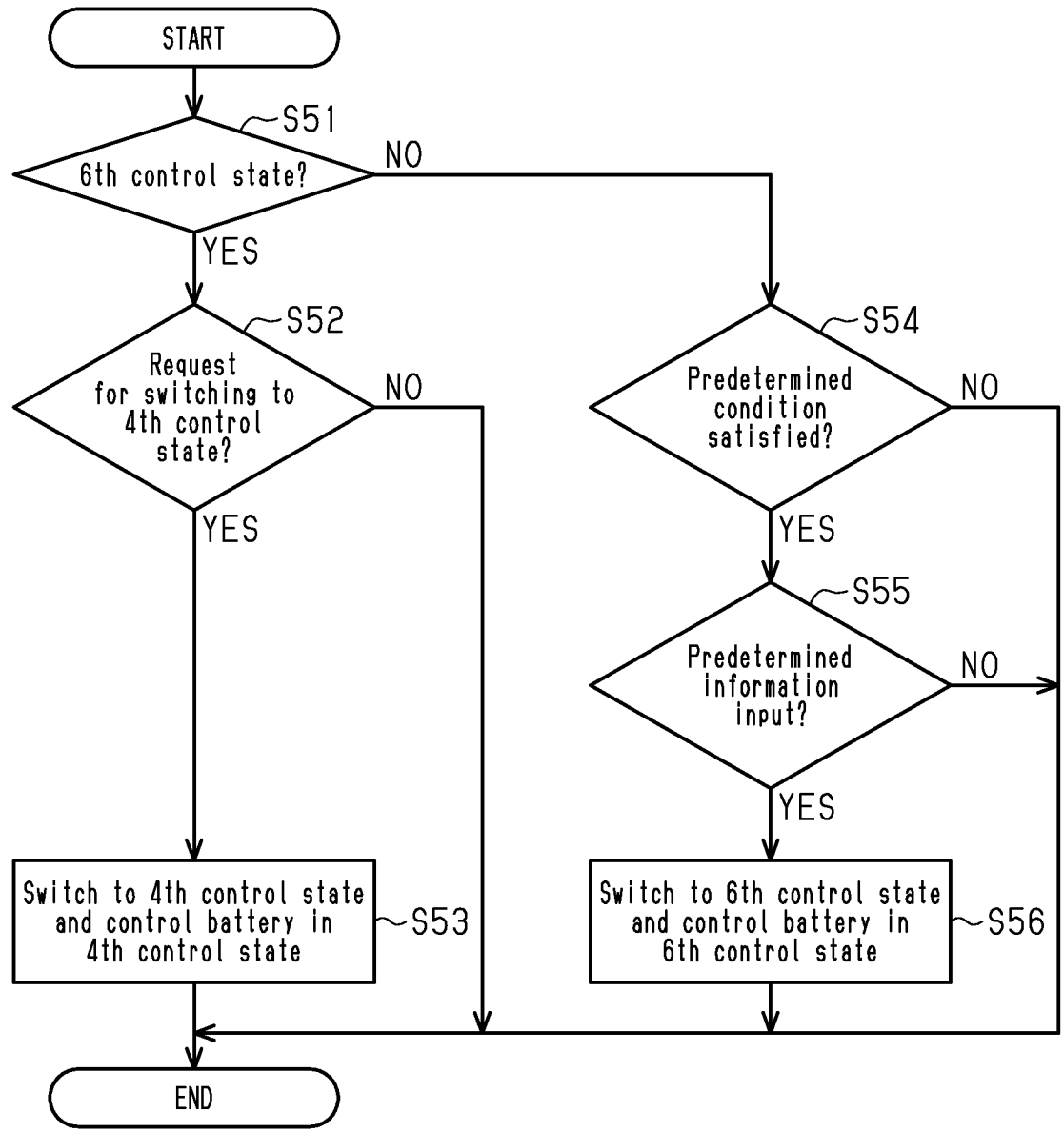
FIG. 10 is a flowchart of a process for switching a control state of a battery executed by the electronic controller shown in FIG. 9.

A third embodiment of the human-powered vehicle control device 70 will now be described with reference to FIGS. 9 and 10. The human-powered vehicle control device 70 of the third embodiment is the same as the human-powered vehicle control device 70 of the first embodiment except that the human-powered vehicle control device 70 of the third embodiment controls the battery 36 instead of the motor 40. Thus, the same reference characters are given to those components that are the same as the corresponding components of the first embodiment. Such components will not be described in detail.

Preferably, the human-powered vehicle control device 70 includes an electronic controller 102. Hereinafter, the electronic controller 102 will be referred to as "the controller 102" for the sake of brevity. The controller 102 includes at least one arithmetic processing unit 102A that executes a predetermined control program. The arithmetic processing unit 102A includes, for example, a CPU or an MPU. When the controller 102 has more than one arithmetic processing unit 102A, the arithmetic processing units 102A can be provided at different positions separate from each other. The controller 102 can include one or more microcomputers 102B. Preferably, the controller 72 includes the controller 102. In other words, the controller 72 and the controller 102 can be integrated together to control both the motor 40 and the battery 36. Alternatively, one of the controller 72 and the controller 102 can be used to control both the motor 40 and the battery 36.

In the present embodiment, the component 38 includes the battery 36. The controller 102 is configured to control the battery 36. The controller 102 is configured to control the battery 36 in a fourth control state. Preferably, the controller 102 is configured to be switchable between the fourth control state and a sixth control state that controls the battery 36 differently from the fourth control state. Preferably, the fourth control state is a control state for a race. The fourth control state is configured so that the battery 36 of the human-powered vehicle 10 used in the same race is controlled under a predetermined condition.

Preferably, in the sixth control state, the controller 102 is configured to control the battery 36 in accordance with at least one of the travel state of the human-powered vehicle 10 and the battery level. Preferably, in the sixth control state, the controller 102 does not limit at least one of a usage time of the battery 36, a usage number of times of the battery 36, and a usage timing of the battery 36.

Preferably, in the fourth control state, the controller 102 limits at least one of the usage time of the battery 36, the usage number of times of the battery 36, and the usage timing of the battery 36.

In a case where the usage time of the battery 36 is limited in the fourth control state, power of the battery 36 is used, for example, so that the usage time of the battery 36 during a predetermined race is within a predetermined fourth accumulated time. In a case where an accumulated time of the usage time of the battery 36 is greater than the predetermined fourth accumulated time in the fourth control state, the controller 102 does not use power of the battery 36. In a case where the usage time of the battery 36 is limited in the fourth control state, power of the battery 36 is used, for example, so that a single continuous usage time of the battery 36 during the predetermined race is within a predetermined continuous usage time. In a case where a single continuous usage time of the battery 36 is greater than the predetermined continuous usage time in the fourth control state, the controller 102 does not use power of the battery 36.

In a case where the usage number of times of the battery 36 is limited in the fourth control state, power of the battery 36 is used, for example, so that the usage number of times of the battery 36 during the predetermined race is within a predetermined fourth number of times. In a case where the usage number of times of the battery 36 becomes the predetermined fourth number of times in the fourth control state, the controller 102 does not use power of the battery 36.

In a case where the usage timing of the battery 36 is limited in the fourth control state, use of power of the battery 36 is prohibited, for example, in a case where the travel state and the travel environment of the human-powered vehicle 10 satisfy a predetermined prohibition condition. The predetermined prohibition condition is satisfied, for example, in at least one of a case where the human-powered vehicle 10 travels in a predetermined area and a case where the human-powered vehicle 10 travels outside the predetermined area. For example, in a case where the human-powered vehicle 10 travels on a circuit course, the predetermined prohibition condition is satisfied in at least one of a case where the number of laps on the circuit course is a predetermined first number of laps, a case where the number of laps is less than a predetermined second number of laps, and a case where the number of laps is greater than or equal to a predetermined third number of laps. For example, in a case where the human-powered vehicle 10 travels on a circuit course, the predetermined prohibition condition can be satisfied in at least one of a case where the human-powered vehicle 10 is located in a predetermined area of the circuit course and a case where the human-powered vehicle 10 is located outside the circuit course.

Preferably, in the fourth control state, in a case where a predetermined condition is satisfied, the controller 102 is switchable from the fourth control state to the sixth control state. Preferably, in the fourth control state, in a case where the predetermined condition is satisfied and predetermined information for switching from the fourth control state to the sixth control state is input, the controller 102 switches from the fourth control state to the sixth control state. Preferably, in the fourth control state, in a case where the predetermined condition is not satisfied and the predetermined information is input, the controller 102 maintains the fourth control state. Preferably, in the fourth control state, in a case where the predetermined condition is satisfied and the predetermined information is not input, the controller 102 maintains the fourth control state.

Preferably, the predetermined condition is satisfied in at least one of a case where an elapsed period from switching of the sixth control state to the fourth control state becomes longer than or equal to a predetermined elapsed period, a case where a predetermined time is reached, a case where traveling on a predetermined traveling route is completed, and a case where a predetermined spot is reached. The predetermined elapsed period includes, for example, a period until a predetermined race ends. The predetermined time includes, for example, a time at which the predetermined race ends. The case where traveling on a predetermined traveling route is completed includes, for example, a case where traveling on a traveling route of a predetermined race is completed. The predetermined spot includes, for example, at least one of a goal point of a predetermined race and a point outside a predetermined region. Preferably, the human-powered vehicle control device 70 includes at least one of a clock, a time receiver, and a GPS receiver, and is configured to determine whether the predetermined condition is satisfied in accordance with information received by the clock, the time receiver, and the GPS receiver.

Preferably, the predetermined information includes at least one of a password and software for switching from the fourth control state to the sixth control state. The password is provided, for example, by an organizer of the predetermined race. The software is provided, for example, by the organizer of the predetermined race.

The controller 102 is configured to switch to the fourth control state in a case where there is a request for switching to the fourth control state in the sixth control state. The request for switching to the fourth control state can be, for example, transmitted from the external device SX or can be set in accordance with an operation performed on an operating portion provided on the human-powered vehicle 10.

A process for switching the control state will now be described with reference to FIG. 10. In a case where electric power is supplied to the controller 102, the controller 102 starts the process and proceeds to step S51 of the flowchart illustrated in FIG. 10. In a case where the flowchart shown in FIG. 10 ends, the controller 102 repeats the process from step S51 after a predetermined interval until the supply of electric power is stopped.

In step S51, the controller 102 determines whether the control state is the sixth control state. In a case where the control state is the sixth control state, the controller 102 proceeds to step S52. In step S52, the controller 102 determines whether there is a request for switching to the fourth control state. In a case where there is no request for switching to the fourth control state, the controller 102 ends the process. In a case where there is a request for switching to the fourth control state, the controller 102 proceeds to step S53. In step S53, the controller 102 switches to the fourth control state, controls the battery 36 in the fourth control state, and ends the process. In a case of switching from the sixth control state to the fourth control state, the controller 102 is configured to control the battery 36 in the fourth control state until the control state is switched to the sixth control state.

In step S51, in a case where the control state is not the sixth control state, the controller 102 proceeds to step S54. In step S54, the controller 102 determines whether a predetermined condition is satisfied. In a case where the predetermined condition is not satisfied, the controller 102 ends the process. In a case where the predetermined condition is satisfied, the controller 102 proceeds to step S55.

In step S55, the controller 102 determines whether the predetermined information is input. In a case where the predetermined information is not input, the controller 102 ends the process. In a case where the predetermined information is input, the controller 102 proceeds to step S56. In step S56, the controller 102 switches to the sixth control state, controls the battery 36 in the sixth control state, and ends the process. In a case of switching from the fourth control state to the sixth control state, the controller 102 is configured to control the battery 36 in the sixth control state until the control state is again switched to the fourth control state.

Modified Examples

The description related to the above embodiments exemplifies, without any intention to limit, applicable forms of a human-powered vehicle control device for a human-powered vehicle, a server that transmits information to a human-powered vehicle component, and a communication system related to a human-powered vehicle according to the present disclosure. The human-powered vehicle control device for a human-powered vehicle, the server that transmits information to a human-powered vehicle component, and the communication system related to a human-powered vehicle according to the present disclosure can be applied to, for example, modified examples of the embodiments that are described below and combinations of at least two of the modified examples that do not contradict each other. In the modified examples described hereinafter, same reference characters are given to those elements that are the same as the corresponding elements of the above embodiments. Such elements will not be described in detail.

Two or more of the first embodiment, the second embodiment, the third embodiment, and the fourth embodiment can be combined and implemented. In this case, switching between the first control state and the second control state, switching between the third control state and the fifth control state, and switching between the fourth control state and the sixth control state can be performed under the same condition or can be performed under different conditions. For example, in a case where the first embodiment is combined with the second embodiment, the first control state can coincide with the third control state or the fifth control state, and the second control state can coincide with the third control state or the fifth control state. For example, in a case where the first embodiment is combined with the third embodiment, the first control state can coincide with the fourth control state or the sixth control state, and the second control state can coincide with the fourth control state or the sixth control state. For example, in a case where the second embodiment is combined with the third embodiment, the third control state can coincide with the fourth control state or the sixth control state, and the fifth control state can coincide with the fourth control state or the sixth control state.

The component 38 can include a suspension device instead of or in addition to at least one of the motor 40, the ABS 98, and the battery 36. In this case, the controller 72 is configured to control the suspension device in a control state that limits use of the suspension device.

The component 38 can include an adjustable seatpost instead of or in addition to at least one of the motor 40, the ABS 98, and the battery 36. In this case, the controller 72 is configured to control the adjustable seatpost in a control state that limits use of the adjustable seatpost.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A human-powered vehicle control device for a human-powered vehicle, the human-powered vehicle control device comprising:
an electronic controller configured to control a motor assisting in propulsion of the human-powered vehicle,
the electronic controller being configured to control the motor in a first control state upon determining that a condition indicating that a user is participating a predetermined race is satisfied, the first control state limiting at least one of a first cumulative driving time that the motor is permitted to be used to assist in propulsion of the human-powered vehicle, a first driving number of times that the motor is permitted to be used to assist in propulsion of the human-powered vehicle, a second cumulative driving time that the motor is permitted to be driven so that an output of the motor becomes greater than or equal to a predetermined output value, and a second driving number of times that the motor is permitted to be driven so that the output of the motor becomes greater than or equal to the predetermined output value.

2. The human-powered vehicle control device according to claim 1, wherein
the electronic controller is configured to limit at least one of the first cumulative driving time, the first driving number of times, the second cumulative driving time, and the second driving number of times regardless of at least one of a travel state of the human-powered vehicle and a battery level of a battery in the first control state.

3. The human-powered vehicle control device according to claim 1, wherein
the electronic controller is configured to switch between the first control state and a second control state that controls the motor differently from the first control state, and the electronic controller is configured to control the motor in accordance with at least one of a travel state of the human-powered vehicle and a battery level of a battery in the second control state.

4. The human-powered vehicle control device according to claim 3, wherein
the electronic controller is configured to control the motor independently of the travel state of the human-powered vehicle and the battery level in the first control state.

5. The human-powered vehicle control device according to claim 3, wherein
the electronic controller is configured to control the motor so that the output of the motor becomes less than or equal to the predetermined output value in the second control state.

6. The human-powered vehicle control device according to claim 3, wherein
the electronic controller is configured to be switchable from the first control state to the second control state in a case where a predetermined condition is satisfied in the first control state.

7. The human-powered vehicle control device according to claim 6, wherein
the electronic controller is configured to switch from the first control state to the second control state in a case where the predetermined condition is satisfied and predetermined information for switching from the first control state to the second control state is input in the first control state.

8. The human-powered vehicle control device according to claim 6, wherein
the electronic controller is configured to maintain the first control state in a case where the predetermined condition is not satisfied and the predetermined information is input in the first control state.

9. The human-powered vehicle control device according to claim 6, wherein
the electronic controller is configured to maintain the first control state in a case where the predetermined condition is satisfied and the predetermined information has not been input in the first control state.

10. The human-powered vehicle control device according to claim 9, wherein
the electronic controller is configured to switch from the first control state to the second control state in a case where the predetermined condition is satisfied and the predetermined information is input in the first control state.

11. The human-powered vehicle control device according to claim 9, wherein
the predetermined information includes at least one of a password and software for switching from the first control state to the second control state.

12. The human-powered vehicle control device according to claim 9, wherein
the predetermined condition is satisfied in at least one of a case where an elapsed period from switching of the second control state to the first control state becomes longer than or equal to a predetermined elapsed period, a case where a predetermined time is reached, a case where traveling on a predetermined traveling route is completed, and a case where a predetermined spot is reached.

13. The human-powered vehicle control device according to claim 3, further comprising
a storage,
the electronic controller being configured to store in the storage information related to which one of the first control state and the second control state is selected.

14. The human-powered vehicle control device according to claim 3, further comprising
a storage,
the electronic controller being configured to output to an external device information related to which one of the first control state and the second control state is selected.

15. The human-powered vehicle control device according to claim 1, further comprising:
a storage configured to store limit information related to driving limitation of the motor; and
a receiver configured to receive the limit information,
the electronic controller being configured to store the limit information received by the receiver in the storage, and
the electronic controller being configured to control the motor in accordance with the limit information in the first control state.

16. The human-powered vehicle control device according to claim 15, wherein
the receiver includes a wireless receiver.

17. The human-powered vehicle control device according to claim 15, wherein
the receiver includes a wired receiver.

18. The human-powered vehicle control device according to claim 1, wherein
in the first control state, the electronic controller is further configured to limit a driving timing at which the motor is permitted to be used to assist in propulsion of the human-powered vehicle.

19. A human-powered vehicle control device for a human-powered vehicle, the human-powered vehicle control device comprising:
an electronic controller configured to switch between a first control state that restricts usage of a motor assisting in propulsion of the human-powered vehicle and a second control state that controls the motor differently from the first control state, the first control state being a control state set upon determining that a condition indicating that a user is participating a predetermined race is satisfied and the second control state being a control state in which the electronic controller controls the motor in accordance with at least one of a travel state of the human-powered vehicle and a battery level of a battery of the human-powered vehicle,
the electronic controller being configured to switch from the first control state to the second control state in a case where a predetermined condition is satisfied and predetermined information for switching from the first control state to the second control state is input in the first control state.

20. The human-powered vehicle control device according to claim 19, wherein
the electronic controller is configured to maintain the first control state in a case where the predetermined condition is not satisfied and the predetermined information is input in the first control state.

21. The human-powered vehicle control device according to claim 19, wherein
the electronic controller is configured to maintain the first control state in a case where the predetermined condition is satisfied and the predetermined information has not been input in the first control state.

22. A human-powered vehicle control device for a human-powered vehicle, the human-powered vehicle control device comprising:
a storage configured to store limit information related to driving limitation of a motor assisting in propulsion of the human-powered vehicle;
a receiver configured to receive the limit information; and
an electronic controller configured to store the limit information received by the receiver in the storage and control the motor in accordance with the limit information upon determining that a condition indicating that a user is participating in a predetermined race is satisfied,
the condition for participating in the predetermined race being satisfied when at least one of the following conditions exists; the human-powered vehicle component can receive information transmitted from a transmitter in a predetermined time slot; and the human-powered vehicle component is located in a predetermined area.

23. A human-powered vehicle control device for a human-powered vehicle, the human-powered vehicle control device comprising:
a receiver configured to receive control information for controlling a human-powered vehicle component;
a storage configured to store the control information, and
an electronic controller configured to store the control information received by the receiver in the storage,
the electronic controller being configured to store the control information received by the receiver in the storage upon determining that a condition indicating that a user is participating in a predetermined race is satisfied,
the condition for participating in the predetermined race being satisfied when at least one of the following conditions exists: the human-powered vehicle component can receive information transmitted from a transmitter in a predetermined time slot; and the human-powered vehicle component is located in a predetermined area.

24. The human-powered vehicle control device according to claim 23, wherein
the condition for participating in the predetermined race is satisfied in a case where information related to entry of the predetermined race is stored in the storage.

25. The human-powered vehicle control device according to claim 23, wherein
the human-powered vehicle component includes a motor assisting in propulsion of the human-powered vehicle, and
the control information includes limit information related to driving limitation of the motor.

26. A human-powered vehicle control device for a human-powered vehicle, the human-powered vehicle control device comprising:
an electronic controller configured to control an antilock brake system of the human-powered vehicle in a third control state upon determining that a condition indicating that a user is participating a predetermined race is satisfied, the third control state limiting at least one of a cumulative operation time of the antilock brake system, an operation number of times of the antilock brake system, and an operation timing of the antilock brake system.

27. A human-powered vehicle control device for a human-powered vehicle, the human-powered vehicle control device comprising:
an electronic controller configured to control a battery of the human-powered vehicle in a fourth control state upon determining that a condition indicating that a user is participating a predetermined race is satisfied, the fourth control state limiting at least one of a cumulative usage time that the battery is permitted to be used and a usage number of times that the battery is permitted to be used.

28. The human-powered vehicle control device according to claim 27, wherein
in the third control state, the electronic controller is further configured to limit a usage timing at which the battery is permitted to be used to assist in propulsion of the human-powered vehicle.

29. A server that transmits information to a human-powered vehicle component, the server comprising:
a storage configured to store control information for controlling the human-powered vehicle component;
a transmitter configured to transmit the control information stored in the storage; and an electronic controller configured to control the transmitter, the electronic controller configured to control the transmitter to transmit the control information to the human-powered vehicle component that satisfies a condition indicating that a user is participating in a predetermined race, the condition for participating in the predetermined race being satisfied when at least one of the following conditions exists: the human-powered vehicle component can receive information transmitted from a transmitter in a predetermined time slot; and the human-powered vehicle component is located in a predetermined area.

30. The server according to claim 29, wherein the condition for participating in the predetermined race is satisfied in a case where information related to entry of the predetermined race is stored in storage of the human-powered vehicle component.

31. The server according to claim 29, wherein the control information includes information corresponding to model numbers of the human-powered vehicle component.

32. The server according to claim 29, wherein the human-powered vehicle component includes a motor assisting in propulsion of the human-powered vehicle, and the control information includes limit information related to driving limitation of the motor.

33. A communication system related to a human-powered vehicle, the communication system comprising the human-powered vehicle control device according to claim 1, and further comprising:
- a server comprising:
  - a storage having stored control information for controlling the human-powered vehicle component;
  - a transmitter configured to transmit the stored control information stored in the storage; and
  - an electronic controller configured to control the transmitter to transmit the control information to the human-powered vehicle component that satisfies the condition for participating in the predetermined race.

34. A method for controlling a human-powered vehicle component, the method comprising:
receiving limit information that limits usage of the human-powered vehicle component from an external device;
storing the limit information in storage; and
controlling the human-powered vehicle component in accordance with the limit information stored in the storage upon determining that a condition indicating that a user is participating in a predetermined race is satisfied,
the condition for participating in the predetermined race being satisfied when at least one of the following conditions exists: the human-powered vehicle component can receive information transmitted from a transmitter in a predetermined time slot; and the human-powered vehicle component is located in a predetermined area.

* * * * *